United States Patent
Shaya et al.

(10) Patent No.: US 7,809,601 B2
(45) Date of Patent: Oct. 5, 2010

(54) INTELLIGENT PERFORMANCE-BASED PRODUCT RECOMMENDATION SYSTEM

(75) Inventors: Steven A. Shaya, Highlands, NJ (US); Neal Matheson, Princeton, NJ (US); John Anthony Singarayar, Skillman, NJ (US); Nikiforos Kollias, Skillman, NJ (US); Jeffrey Adam Bloom, Plainsboro, NJ (US)

(73) Assignee: Johnson & Johnson Consumer Companies, Skillman, NJ (US)

( * ) Notice: Subject to any disclaimer, the term of this patent is extended or adjusted under 35 U.S.C. 154(b) by 1986 days.

(21) Appl. No.: 09/981,516

(22) Filed: Oct. 17, 2001

(65) Prior Publication Data

US 2002/0161664 A1 Oct. 31, 2002

Related U.S. Application Data

(60) Provisional application No. 60/241,405, filed on Oct. 18, 2000.

(51) Int. Cl.
G06F 17/30 (2006.01)
(52) U.S. Cl. .............................. 705/10; 705/14; 705/26; 700/233; 700/236
(58) Field of Classification Search .................. 700/233; 705/10, 26, 27, 28, 29, 7, 8, 9; 707/5
See application file for complete search history.

(56) References Cited

U.S. PATENT DOCUMENTS

| | | | |
|---|---|---|---|
| 5,041,972 A | 8/1991 | Frost | 364/401 |
| 5,550,746 A | 8/1996 | Jacobs | 364/479.01 |
| 5,583,763 A | 12/1996 | Atcheson et al. | 364/551.01 |
| 5,659,666 A | 8/1997 | Thaler | 395/21 |
| 5,704,017 A | 12/1997 | Heckerman et al. | 395/61 |
| 5,715,399 A | 2/1998 | Bezos | 395/227 |

(Continued)

FOREIGN PATENT DOCUMENTS

EP 1028386 A2 8/2000

(Continued)

OTHER PUBLICATIONS

Alspector, J. et al., Feature-based and Clique-based User Models for Movie Selection: a Comparative Study, *User Modeling and User-Adapted Interaction*, 1997, 7, 279-304.

(Continued)

*Primary Examiner*—Marissa Thein
(74) *Attorney, Agent, or Firm*—Woodcock Washburn LLP

(57) ABSTRACT

Systems and methods of utilizing communications networks and multivariate analysis to predict or recommend optimal products from a predefined population of commercially available products are disclosed. The recommendations are based on intelligence contained in processing elements and subjective and/or objective product information received from consumers or input to the systems as part of their initial setup. The output of the systems comprise sets of products that they predict the consumer will prefer and/or perform well for the problem or concern identified by the consumer. The performance and preference predictions are a function of consumer problems and product responsiveness patterns. Objective product information is generally obtained with diagnostic instruments. Data measured with the diagnostic instruments may be communicated to the data processing portions of the invention via the Internet. The outputs of the data processing portion of the system may be presented to consumers via the Internet as well.

30 Claims, 12 Drawing Sheets

U.S. PATENT DOCUMENTS

| | | | | |
|---|---|---|---|---|
| 5,724,258 | A | 3/1998 | Roffman | 364/525 |
| 5,749,081 | A | 5/1998 | Whiteis | 707/102 |
| 5,758,095 | A | 5/1998 | Albaum et al. | 395/202 |
| 5,765,028 | A | 6/1998 | Gladden | 395/11 |
| 5,790,426 | A | 8/1998 | Robinson | 364/554 |
| 5,790,977 | A | 8/1998 | Ezekiel | 702/122 |
| 5,796,611 | A | 8/1998 | Ochiai et al. | 364/420 |
| 5,822,745 | A | 10/1998 | Hekmatpour | 706/59 |
| 5,825,907 | A | 10/1998 | Russo | 382/124 |
| 5,839,438 | A | 11/1998 | Graettinger et al. | 128/630 |
| 5,839,585 | A | 11/1998 | Miller | 211/49.1 |
| 5,842,199 | A | 11/1998 | Miller et al. | 707/2 |
| 5,845,271 | A | 12/1998 | Thaler | 706/16 |
| 5,852,815 | A | 12/1998 | Thaler | 706/16 |
| 5,852,816 | A | 12/1998 | Thaler | 706/20 |
| 5,865,322 | A | 2/1999 | Miller | 211/49.1 |
| 5,875,110 | A * | 2/1999 | Jacobs | 700/232 |
| 5,884,282 | A | 3/1999 | Robinson | 705/27 |
| 5,918,014 | A | 6/1999 | Robinson | 395/200.49 |
| 5,947,302 | A | 9/1999 | Miller | 211/49.1 |
| 5,960,411 | A | 9/1999 | Hartman et al. | 705/26 |
| 5,963,949 | A | 10/1999 | Gupta et al. | 707/100 |
| 5,999,924 | A | 12/1999 | Bair et al. | 707/4 |
| 6,006,225 | A | 12/1999 | Bowman et al. | 707/5 |
| 6,014,639 | A | 1/2000 | Fohn et al. | 705/27 |
| 6,016,475 | A | 1/2000 | Miller et al. | 705/1 |
| 6,018,738 | A | 1/2000 | Breese et al. | 707/100 |
| 6,029,141 | A | 2/2000 | Bezos et al. | 705/27 |
| 6,029,195 | A * | 2/2000 | Herz | 725/116 |
| 6,041,311 | A | 3/2000 | Chislenko et al. | 705/27 |
| 6,064,979 | A | 5/2000 | Perkowski | 705/26 |
| 6,064,980 | A | 5/2000 | Jacobi et al. | 705/26 |
| 6,090,044 | A | 7/2000 | Bishop et al. | 600/300 |
| 6,092,049 | A | 7/2000 | Chislenko et al. | 705/10 |
| 6,101,486 | A | 8/2000 | Roberts et al. | 705/27 |
| 6,112,192 | A | 8/2000 | Capek | 705/59 |
| 6,113,540 | A | 9/2000 | Iliff | 600/300 |
| 6,119,093 | A | 9/2000 | Walker et al. | 705/4 |
| 6,119,100 | A | 9/2000 | Walker et al. | 705/20 |
| 6,128,599 | A | 10/2000 | Walker et al. | 705/14 |
| 6,128,607 | A | 10/2000 | Nordin et al. | 706/13 |
| 6,131,087 | A | 10/2000 | Luke et al. | 705/26 |
| 6,134,532 | A | 10/2000 | Lazarus et al. | 705/14 |
| 6,144,964 | A | 11/2000 | Breese et al. | 707/10 |
| 6,151,581 | A | 11/2000 | Kraftson et al. | 705/3 |
| 6,167,383 | A | 12/2000 | Henson | 705/26 |
| 6,223,165 | B1 | 4/2001 | Lauffer | 705/8 |
| 6,236,975 | B1 | 5/2001 | Boe et al. | 705/7 |
| 6,266,649 | B1 | 7/2001 | Linden et al. | 705/26 |
| 6,321,179 | B1 | 11/2001 | Glance et al. | 702/189 |
| 6,321,221 | B1 * | 11/2001 | Bieganski | 707/5 |
| 6,356,879 | B2 | 3/2002 | Aggarwal et al. | 705/26 |
| 6,389,372 | B1 | 5/2002 | Glance et al. | 702/189 |
| 6,412,012 | B1 * | 6/2002 | Bieganski et al. | 709/232 |
| 6,438,579 | B1 * | 8/2002 | Hosken | 709/203 |
| 6,487,539 | B1 | 11/2002 | Aggarwal et al. | 705/14 |
| 6,487,541 | B1 | 11/2002 | Aggarwal et al. | 705/26 |
| 6,655,963 | B1 | 12/2003 | Horvitz et al. | 434/236 |
| 6,782,307 | B2 * | 8/2004 | Wilmott et al. | 700/233 |
| 6,782,370 | B1 * | 8/2004 | Stack | 705/10 |
| 6,801,909 | B2 | 10/2004 | Delgado et al. | 707/4 |
| 2001/0013009 | A1 | 8/2001 | Greening et al. | 705/10 |
| 2001/0014868 | A1 | 8/2001 | Herz et al. | 705/14 |
| 2002/0065683 | A1 | 5/2002 | Pham et al. | 705/2 |
| 2002/0178057 | A1 | 11/2002 | Bertram et al. | 705/14 |
| 2003/0050825 | A1 | 3/2003 | Gallivan et al. | 705/10 |
| 2003/0061096 | A1 | 3/2003 | Gallivan et al. | 705/14 |
| 2003/0088480 | A1 | 5/2003 | Berghofer et al. | 705/26 |
| 2003/0110056 | A1 | 6/2003 | Berghofer et al. | 705/1 |
| 2003/0149612 | A1 | 8/2003 | Berghofer et al. | 705/10 |
| 2004/0034570 | A1 | 2/2004 | Davis | 705/26 |
| 2004/0059626 | A1 | 3/2004 | Smallwood | 705/10 |
| 2004/0076936 | A1 | 4/2004 | Horvitz et al. | 434/236 |
| 2004/0176966 | A1 | 9/2004 | Chen | 705/1 |
| 2004/0215500 | A1 | 10/2004 | Monahan | 705/10 |
| 2004/0260666 | A1 | 12/2004 | Pestotnik et al. | |
| 2005/0154627 | A1 | 7/2005 | Zuzek et al. | |

FOREIGN PATENT DOCUMENTS

| | | | |
|---|---|---|---|
| EP | 1100134 | A2 | 5/2001 |
| JP | 11007472 | A | 1/1999 |
| JP | 11282875 | A | 10/1999 |
| WO | 95/28806 | | 10/1995 |
| WO | 97/02537 | A | 1/1997 |
| WO | 98/02836 | | 1/1998 |
| WO | 98/02837 | | 1/1998 |
| WO | 98/10697 | | 3/1998 |
| WO | 98/58334 | | 12/1998 |
| WO | 99/54828 | | 10/1999 |
| WO | 00/42593 | | 7/2000 |
| WO | WO 00/39725 | | 7/2000 |
| WO | 00/45302 | | 8/2000 |
| WO | 00/60522 | | 10/2000 |
| WO | 00/63837 | | 10/2000 |
| WO | 01/09701 | | 2/2001 |
| WO | WO 01/24094 | A1 | 4/2001 |
| WO | WO 01/58238 | * | 8/2001 |
| WO | 02/03902 | A2 | 1/2002 |

OTHER PUBLICATIONS

Baker, A.D. et al., "Internet-Based Manufacturing: A Perspective from the AARIA Project", Working Paper, Enterprise Action Group, Inc., Cincinnati, Ohio, Aug. 12, 1999, 1-12.

Balabanović, M. et al., "Combining Content-Based and Collaborative Recommendation", *Communications of the ACM*, 1997, 1-9 http://citeseer.nj.nec.com/balabanovic97combining.html.

Basu, C. et al., "Recommendation as Classification: Using Social and Content-Based Information in Recommendation", *Proceedings of the Fifteenth National Conference on Artificial Intelligence AAAI-98)*, Jul. 1998, Madison, WI, 5 pages http://citeseer.nj.nec.com/basu98recommendation.html.

Cohen, W., "Fast Effective Rule Induction", *Proc. 12th International Conference of Machine Learning (MI-95)*, 1995, 9 pages.

Fahlman, S.E. et al., "The Cascade-Correlation Learning Architecture", In *Advances in Neural Information Processing Systems 2*, Touretzky, D.S. (Ed.), 524-532, San Mateo, California, 1990, Morgan Kaufman Publishers Inc., 1-12.

Feldman S.R. et al., "Patients seen in a dermatology clinic have unmet preventive health care needs", *J Am Acad Dermatol*, Apr. 2001, 44(4), 706-9.

Frankewitsch, T. et al., "Multimedia Explorer: Image Database, Image Proxy-server and Search-engine", *roc AMIA Symp*, 1999, 765-9.

Harris, J.M. et al., "Can Internet-based Continuing Medical Education Improve Physicians' Skin Cancer Knowledge and Skills?," *J Gen Intern Med*, Jan. 2001, 16(1), 50-56.

Hill, W. et al., "Recommending and Evaluating Choices in a Virtual Community of Use", *Proceedings of the CHI-95 Conference*, 1995, Denver, Colorado, 17 pages.

Hudomalj, E. et al., "Digital library of medical images and video clips", *Dermatology Online Journal*, 1999, 5 pages http://vvww.kb.nl.coop/elag/elag99/presentations/hudomalj.html.

Kindler, H. et al., "A Multimedia Database for Dermatology", Cesnik, B. et al. (Eds.), *Medinfo*, 1998, 9(1), 70-4.

Kindler, H. et al., "Internet-based Physician's Workbench as User Interface for a Central Medical Case Repository", *Methods Inf Med*, 1999, 38(3), 194-9.

Kosters, W.A. et al., "Understanding customer choice processes using neural networks", In: *Proceedings of the First International Conference on the Practical Application of Knowledge Discovery and Data Mining (PADD '97)*, 1997, 167-178, The Practical Application Company, London, 1997.

Levy, A.Y. et al., "Intelligent Internet Systems", *Artificial Intelligence*, 2000, 118, 1-14.

Lin, C. et al., "A Unified Multimedia Database System to Support Telemedicine", *IEEE Trans Inf Technol Biomed*, Sep. 1998, 2(3), 183-192.

Palmissano, C. et al., "Geriatric Dermatology in Chronic Care and Rehabilitation", *Dermatol Nurs*, Apr. 2000, 12(2), 116-23.

Pazzani, M. et al., "Syskill & Webert: Identifying Interesting Web Sites", *Proceedings of the Thirteenth National Conference on Artificial Intelligence (AAAI-96)*, 1996, Portland, Oregon, 54-61.

Prassas, D. et al., Dynamic Recommendations in Internet Retailing, *eLTRUN (Electronic Trading Research Unit)*, Athens University of Economics and Business, 47A Evelpidon & 33 Lefkados Str. 113 62, Athens, Greece, 1-13 http://www.eltrun.aueb.gr/papers/ecis20011.doc.

Quinlan, J., "C4.5: Programs for machine learning", 1993, Morgan Kaufmann Publishers.

Ramirez, O.M., "High-Tech Facelift", *Aesthetic Plas. Surg*, 1998, 22(5), 318-28.

Resnick, P. et al., "Recommender Systems", *Communications of the ACM*, 1997, 40(3), 56-58.

Sarwar, B. et al., "Analysis of Recommendation Algorithms for E-Commerce", *In Proceedings of ACM E-Commerce*, 2000, Minneapolis, Minn., 158-167 http://citeseer.nj.nec.com/article/sarwar00analysisl.html.

Schafer, J., et al., "Recommender Systems in E-Commerce", *In ACM Conference on Electronic Commerce*, 1999, pp. 158-166, Denver, Colorado, 9 pages http://citeseer.nj.nec.com/schafer99recommender.html.

Schalkoff, R.J., "Artificial Neural Networks", (McGraw-Hill, 1997).

Schwab, I. et al., "Learning to recommend from positive evidence", in *Proc. 2000 Int. Conf. On Intelligent User Interfaces*, 2000, pp. 241-247, New Orleans, http://citeseer.nj.nec.com/schwab00learning.html.

Shardanand, U. et al., "Social Information Filtering: Algorithms for Automating 'Word of Mouth'", *Proceedings of the CHI-95 Conference*,1995, Denver, Colorado, 13 pages.

Todorovski, L., "Organization and dissemination of multimedia medical databases on the WWW", In: Kokol, P. et al. (Eds.) *Medical Informatics Europe '99*, Amsterdam: IOS Press, 1999, 557-561.

van der Putten, P., "Data Mining in Direct Marketing Databases", *World Scientific*, Oct. 15, 1998, 1-15 http://citeseer.nj.nec.com/putten98data.html.

van Wezel, M.C. et al., "Determining the number of dimensions underlying customer-choices with a competitive neural network", *Proceedings of the IEEE International Conference on Neural Networks (ICNN '96)*, 1996, 1, 484-490.

Wainwright, B.D., "Clinically relevant dermatology resources and the Internet: An introductory guide for practicing physicians", *Dermatol Online J*, Nov. 1999, 5(2), 8.

Downs, M., "Visualizing Longitudinal Ordinal Data Using Data Mosaics", Statistics Collaborative, Inc., Washington DC, 4 pages, No Date Available.

Khutoryansky, N. M., "Parameter Estimation for Incomplete Bivariate Longitudinal Data in Clinical Trials", Novo Nordisk Pharmaceuticals, Inc., Princeton, NJ, 2003, 6 pages.

Mallinckrodt, C.H. et al., "Assessing Response Profiles for Longitudinal Clinical Trial Data with Subject Dropout under Regulatory Considerations", Technical Report 0221, IAP Statistics Network, Interuniversity Attraction Pole, http://www.stat.ucl.ac.be/IAP, 2002, 22 pages.

* cited by examiner

| Identification | Shipping Information | Credit Information | Severity of Needs | Importance of Addressing Needs |
|---|---|---|---|---|
| Acceptance Ratings (historical usage) | Psychographic Characterizers | Current Diagnostic Condition | | |

Fig. 5

| Identification | Shipping Information | Credit Information | Severity of Needs | Importance of Addressing Needs |
|---|---|---|---|---|
| Acceptance Ratings (historical usage) | Psychographic Characterizers | Current Diagnostic Condition | | |

| Acceptance Rating (of selected products) | Diagnostic Data Relative to Time of Usage | Aesthetic Preferences Relative to Current Product | |
|---|---|---|---|

Fig. 6

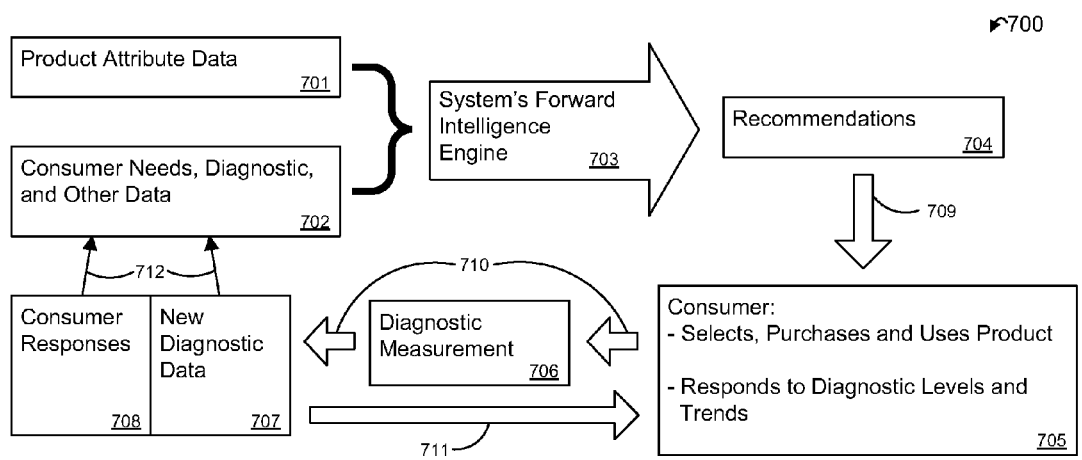

Fig. 7

| Product | Preference Prediction | Performance Prediction | Price |
|---|---|---|---|
| A | 8.4 | 5.1 | 11.89 |
| B | 8.1 | 6.6 | 19.99 |
| C | 7.8 | 5.0 | 23.59 |

| Recommendation | Preference | Performance | Cost |
|---|---|---|---|
| Product A | 8.6 | 5.1 | $13.95 |
| Product B | 8.4 | 4.6 | $7.83 |
| Product C | 8.2 | 6.0 | $11.90 |

| Product | Preference Prediction | Performance Prediction | Price |
|---|---|---|---|
| D | 4.4 | 8.2 | 39.99 |
| E | 6.7 | 7.9 | 14.29 |
| F | 7.4 | 7.8 | 21.89 |

| Recommendation | Performance | Preference | Cost |
|---|---|---|---|
| Product G | 7.1 | 5.1 | $18.85 |
| Product H | 6.9 | 7.0 | $24.14 |
| Product I | 6.7 | 3.7 | $37.95 |

INTELLIGENT PERFORMANCE-BASED PRODUCT RECOMMENDATION SYSTEM

I. CROSS REFERENCE TO RELATED APPLICATIONS

This application claims the benefit of U.S. Provisional Application Ser. No. 60/241,405, filed Oct. 18, 2000, the contents of which is fully incorporated herein by reference.

II. BACKGROUND

A. Field of the Invention

The present invention relates generally to systems and methods for generating, communicating and processing product information. More particularly, the invention is directed to gathering subjective and objective data on the effects of products from consumers and using that data to generate product recommendations and ancillary information, to periodically improve the accuracy of the recommendations, and to communicate the product recommendations and ancillary information to the consumers.

B. Description of the Related Art

Many commercially available products provide useful results only after prolonged use. For some products, their effects may be incremental during the period of use. The changes wrought by the use of many products therefore may not be fully appreciated by consumers. This lack of appreciation results from, among other things, the inability of the consumer to meaningfully compare conditions pre- and post-product use. Rather, as conditions change, however incrementally, there is a tendency to compare results to a condition after product use has begun. As a consequence, the consumer may get a false impression of the product's efficacy be it positive, negative, or neutral.

Further compounding the inability of consumers to meaningfully assess the efficacy of many commercially available products is the difficulty of testing the many options in the market and the failure or inability of many products to carry labels communicating their objective performance with respect to the conditions of interest to consumers. The advent of the Internet and developments in the areas of recommendation systems, neural networks, and collaborative filtering, however, now provide opportunities to address the foregoing problems.

The Internet and Other Public and Private Networks

The term "Internet" is an abbreviation for "Internetwork" and commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the networks. Because of such wide-spread information sharing, remote networks such as the Internet have thus far generally evolved into an "open" system for which developers can design software applications for performing specialized operations or services, essentially without restriction.

Electronic information transferred between data-processing networks is usually presented in hypertext, a metaphor for presenting information in a manner in which text, images, sounds, and actions become linked together in a complex non-sequential web of associations that permit the user to "browse" or "navigate" through related topics, regardless of the presented order of the topics. These links are often established by both the author of a hypertext document and by the user, depending on the intent of the hypertext document. For example, traveling among links to the word "iron" in an article displayed within a graphical user interface in a data-processing system might lead the user to the periodic table of the chemical elements (i.e., linked by the word "iron"), or to a reference to the use of iron in weapons in Europe in the Dark Ages. The term "hypertext" was coined in the 1960s to describe documents, as presented by a computer, that express the nonlinear structure of ideas, as opposed to the linear format of books, film, and speech.

A typical networked system that utilizes hypertext conventions follows a client/server architecture. The "client" is a member of a class or group that uses the services of another class or group to which it is not related. Thus, in computing, a client is a process (i.e., roughly a set of instructions or tasks) that requests a service provided by another program. The client process utilizes the requested service without having to "know" any working details about the other program or the service itself. In a client/server architecture, particularly a networked system, a client is usually a computer that accesses shared network resources provided by another computer (i.e., a server).

Client and server communicate with one another utilizing the functionality provided by Hypertext-Transfer Protocol (HTTP). The World Wide Web (WWW) or, simply, the "Web," includes those servers adhering to this standard (i.e., HTTP) which are accessible to clients via a computer or data-processing system network address such as a Uniform Resource Locator (URL). The network address can be referred to as a Universal Resource Locator address. For example, communication can be provided over a communications medium. In particular, the client and server may be coupled to one another via TCP/IP connections for high-capacity communication. Active within the client is a first process, known as a "browser," which establishes the connection with the server and presents information to the user. The server itself executes corresponding server software that presents information to the client in the form of HTTP responses. The HTTP responses correspond to "web pages" constructed from a Hypertext Markup Language (HTML), or other server-generated data. Each web page can also be referred to simply as a "page."

The client typically displays the information provided through the network by the server, using a software application known as a browser. Most browsers have modem graphical user interfaces that are capable of displaying and manipulating various types of data. A graphical user interface is a type of display format that enables a user to choose commands, start programs, and see lists of files and other options by pointing to pictorial representations (icons) and lists of menu items on the screen. Choices can be activated generally either with a keyboard or a mouse. Internet services are typically accessed by specifying a unique network address (i.e., typically with a URL). The URL address has two basic components, the protocol to be used and the object pathname. For example, the URL address, "http://www.uspto.gov" (i.e., home page for the U.S. Patent and Trademark Office), specifies a HTTP and a pathname of the server ("www.uspto.gov"). The server name is associated with one or more equivalent TCP/IP addresses.

Neural Network Analysis

Neural network analysis is a method of modeling non-linear relationships between independent and dependent variables. The analysis is performed by creating a network that accurately models the relationship between the independent and dependent variables. Once a valid neural network is created it can be used to predict values of unknown, dependent variables on the basis of known, independent variables. By convention, in neural network analysis, independent variables are called inputs and dependent variables are called outputs.

The power of a neural network lies in the non-linear equation(s) that it uses to model the relationship(s) between the inputs and the outputs. The equation is a complex function that is defined by a set of variables called connection weights. Specific values for the connection weights are determined by a training algorithm which examines a set of training data. The training data is a set of inputs and associated outputs that are representative of the nonlinear relationship being modeled. The training algorithm processes the training data inputs and finds a set of connection weights that minimize the error between the predicted output of the neural network and the training data output.

A neural network is structurally comprised of an input layer, one or more hidden layers, and an output layer. The output and hidden layers are comprised of interconnected processing elements, which are the main building blocks of the neural network. The primary function of the input layer is to route input values to processing elements of the first hidden layer. Each processing element multiplies each input by a different connection weight value to obtain a product and then sums the individual products. The results are passed through a non-linear transfer function to produce a processing element output. All processing element outputs of one layer are routed to processing element inputs of the next layer where similar processing is repeated. The final layer in a neural network is the output layer and it may contain linear and/or non-linear processing elements. Non-linear processing elements process inputs in the same manner described above. Linear processing elements simply pass the input of the processing element to the output of the processing element. The outputs of the processing elements in the output layer produce the final output of the neural network.

Other neural network design considerations include whether the neural network is a fully connected and/or a feedforward design. A neural network is fully connected if all outputs from one layer are used as inputs to the next layer. A neural network is feedforward if there are no internal feedback loops (i.e. no outputs from one layer are used as inputs to a previous layer).

The first step in creating a neural network is to define what is to be output. These outputs will be the final outputs of the neural network. The next step is to identify all variables that will materially influence the value of the outputs. These variables will be the inputs to the neural network. Once the network inputs and outputs have been identified the remaining structure of the neural network, including the number of layers and the number of processing elements in each layer, may be determined.

Once the structure of the neural network is determined, the neural network can be created. After creation, the neural network is trained using training data. Training data is a set of data, including input variables and associated output variables, which represent the statistical relationship(s) to be modeled by the neural network. The more training data collected and used the better, particularly if the relationship(s) being modeled is statistical in nature.

Training is accomplished by a training algorithm that is implemented by the neural network. The training algorithm processes the training data and selects appropriate connection weights that most closely model the relationship between the training data inputs and the training data outputs.

Once trained, the performance of the neural network can be evaluated using test data. Testing a neural network is accomplished as follows. Test data inputs are individually input into the neural network. The neural network is run and predicted outputs are generated for each test input. The predicted outputs are compared to actual test data outputs to determine if the neural network is performing properly. A neural network that performs poorly on test data should not be used.

After a neural network is trained it can be used to predict outputs based on various inputs. The resulting predictions then can be used for the purpose for which the neural network was designed. Examples of neural networks are shown and described in U.S. Pat. No. 5,724,258 titled "Neural Network Analysis For Multifocal Contact Lens Design," and U.S. Pat. No. 5,839,438 titled "Computer-based Neural Network System and Method for Medical Diagnosis and Interpretation," both of which are incorporated herein fully by reference. Other details and principles regarding neural networks are set forth in "Artificial Neural Networks," Robert J. Schalkoff (McGraw-Hill, 1997), the contents of which also are incorporated herein fully by reference.

Existing Product Recommendation Systems

The rise of the Internet and its role in e-commerce has resulted in a number of product recommendation systems and methods being developed. Most of these systems share one or more of the following objectives and approaches. First, the systems attempt to help each customer find a small, more manageable sub-set of products that may be more valuable to him or her from amongst thousands of products. In most cases, a customer simply could not browse the product descriptions of the complete set of products; and even if they could, the product descriptions do not contain enough relevant information to enable the customer to assess the value of a specific product with respect to his or her concerns and interests. Second, the systems seek to determine the customer's specific product preferences by analyzing the customer's purchase behavior and product usage feedback. This kind of information extends that available from simple, explicit customer profiles generated through surveys. Third, the recommendation systems seek to exploit information from other customers that is similar to a given customer in some form or another.

Many of these recommendation systems utilize techniques such as collaborative or content-based filtering to supplement information available about a customer's individual behavior. The success of systems using techniques like filtering hinge on the assumption (reasonable in many circumstances) that there is a material degree of overlap in the interests, concerns, and characteristics of the numerous customers served by the systems. However, it is often technically challenging to define the appropriate group or "neighborhood" of similar customers for a given customer, and also to then predict the individual's preferences from those in the neighborhood with present recommendation systems. Finally, some of the present recommendation systems periodically adapt the recommendations to incorporate ongoing customer experience and behavior, though in a very limited and simple fashion.

General categories of existing product recommendation systems follow. It should be noted however that many of the present systems do not fall neatly into any single category Also, the following few categories are not intended to be exhaustive.

One type of existing product recommendation system is a non-personalized recommendation system. Non-personalized systems recommend products to individual consumers based on averaged information about the products provided by other consumers. Examples of non-personalized product recommendation systems are those of Amazon.com and Moviefinder.com. The same product recommendations are made to all consumers seeking information about a particular product(s) and all product recommendations are completely independent of any particular consumer.

Another type of existing product recommendation system employs item-to-item correlation to formulate recommendations. Item-to-item systems recommend other products to an individual consumer based on relationships between products already purchased by the consumer or for which the consumer has expressed an interest. The relationships employed typically are brand identity, fragrance, sales appeal, market distribution, and the like. In all cases the information on which the relationships are based is implicit. In other words, no explicit input regarding what the consumer is looking for or prefers is solicited by these systems. Rather, techniques such as data mining are employed to find implicit relationships between products for which the individual consumer has expressed a preference and other products available for purchase. The actual performance of products or whether the consumer (or other consumers) ultimately did prefer the products purchased play no part in formulating recommendations with these types of systems.

A third type of existing product recommendation system is an attribute-based system. Attribute-based recommendation systems utilize syntactic properties or descriptive "content" of available products to formulate their recommendations. In other words, attribute-based systems assume that the attributes of products are easily classified and that an individual consumer knows which classification he or she should purchase without help or input from the recommendation system. An exemplary attribute-based recommendation system is the MOVIE MAP service offered by Reel.com. With the MOVIE MAP service the recommendations presented are based solely on the category of movie selected by the consumer. One of the major shortcomings of attribute-based systems is that there is often confusion among consumers and/or professionals about the proper classification of attributes to achieve successful recommendations. For example, in the case of automobile wax for an older vehicle there is disagreement over whether a silicone- or wax-based cream or lotion will provide optimal results.

In the area of product recommendation systems collaborative filtering has proven more reliable than content-based filtering. Nonetheless, both will be discussed as certain embodiments of the present invention may utilize one and/or both types of filters.

Content-Based Filtering

Figures 1, 2:
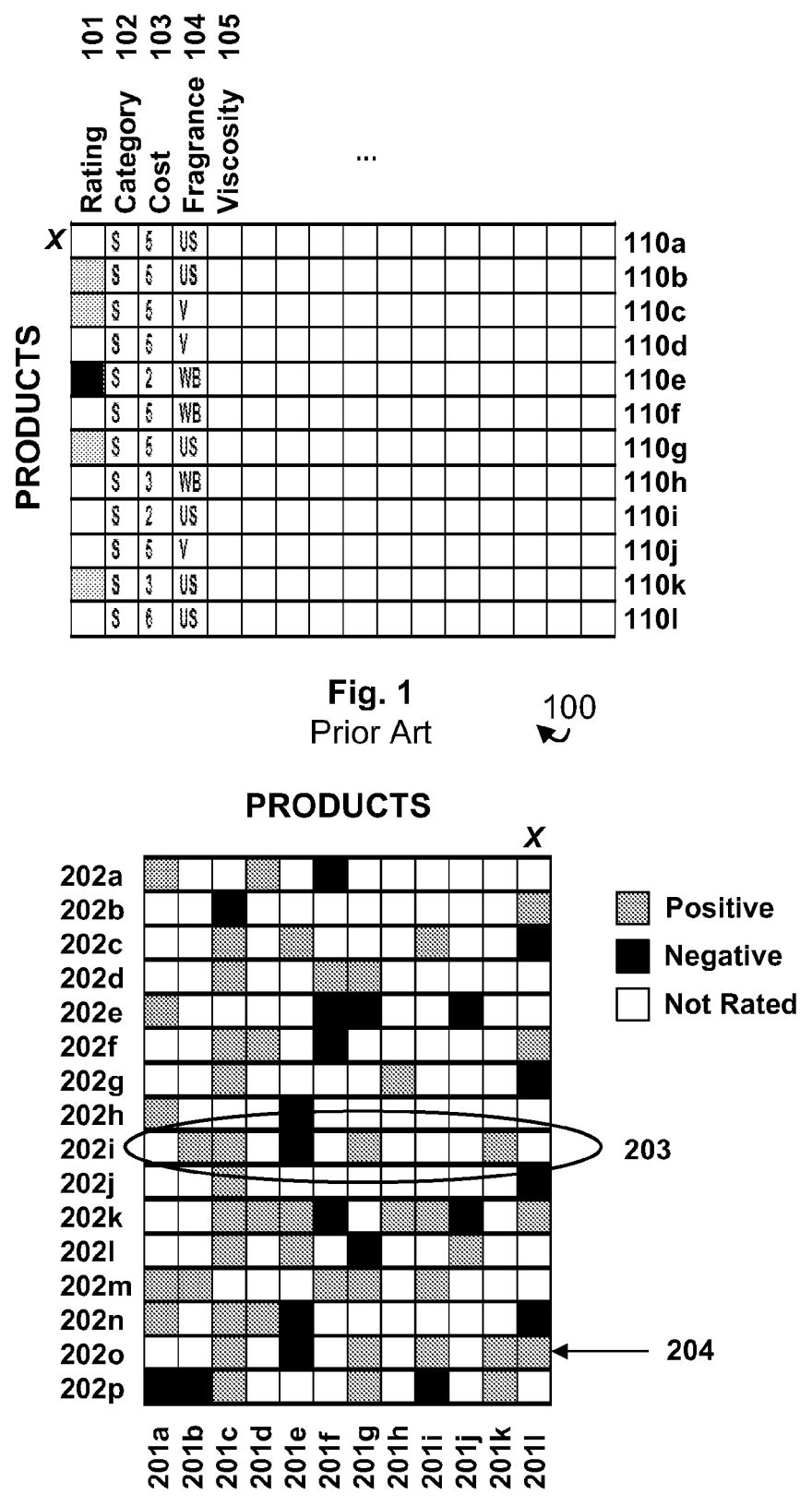

FIG. 1 illustrates some of the principles behind content-based filtering. Matrix 100 is shown for a single user. The prediction is blind to data from other users, and the system assumes all product ratings are binary (i.e., positive or negative). The matrix is not sparse. Assuming the category 102 is soap (S), a content-based filtering technique examines matrix 100 to identify the features (cost 103, fragrance 104, viscosity 105, and the like) associated with the products 110a-110l having a rating 101 by the user (e.g., 110b-c, 110e, 110g, and 110k). The appropriate features 103-105 are then used to characterize the user. Predicted ratings 101 for products not actually rated by the user (e.g., products 110a, 110d, 110f, 110h-j, and 110l) are then mapped into the feature space based on their proximity to clusters of rated products. For example, it can be deduced from the information about the rated products in the matrix that the consumer it characterizes generally prefers soaps with higher cost 103 (ranked from 1 to 10, 1 representing least expensive and 10 representing most expensive) and have an unscented (US) fragrance 104 (scented=V and wild berry scents=WB). Therefore, although the user characterized by matrix 100 has not actually rated product 110a one might predict using content-based filtering that because product 110a is unscented and moderately expensively the user would rate product 110a favorably. Note, there are many techniques for determining the appropriate product features to populate a feature space accurately reflecting the individual user, and features may be added or deleted over time as the system learns more about a particular user or the user's preferences change.

Collaborative Filtering

Collaborative filtering (also referred to as social-information filtering) on the other hand, typically records an extended product preference set that can be matched with a collaborative group. In other words, collaborative filters recommend products that "similar users" have rated highly. Often the social-information is a similar pattern of product preferences.

FIG. 2 illustrates some of the principles underlying collaborative filtering. Once again binary product ratings are assumed. Grid 200 is comprised of product columns 201a-201l and user rows 202a-202p. If the system possesses any rating data for a particular product and user, that data is entered in grid 200 at the cell formed by the intersection of the appropriate product column and user row. For example, from grid 200 it can be seen that user 202a rated product 201a positively. With all the rating data entered in matrix 200 one still expects it to be sparsely populated. The goal of a collaborative filter is to fill in the cells having no ratings data with accurate predictions based on the ratings given by similar users mapped in matrix 200. Consider target user 202i, whose ratings for products 201a-l are enclosed in circle 203. Collaborative filtering identifies user 202o as being similar to target user 202i in his or her ratings of products 202a-p (indicated by arrow 204). Based on this similarity the system might predict that like user 202o, target user 202i would rate product 201l positively as well if he or she actually used it. The system therefore may recommend product 201l to target user 202i. One skilled in the art of collaborative filters will appreciate that a number of techniques exist for generating predictions based on multiple similar users, for selecting appropriate subsets of nearest neighbors on which to base predictions, for incorporating real-valued ratings in the process, and for making real-valued predictions.

Attempts have been made to combine collaborative and content-based filtering in a single system. Combining collaborative and content-based filtering resulted in improved collaborative filtering predictions where the user database was segmented in accordance with content-based filters. An exemplary combined system is described in "Recommendation as Classification: Using Social and Content-Based Information in Recommendation," Proceedings of the Fifteenth National Conference on Artificial Intelligence (AAAI-98), (Basu, C.; Hirsh, H.; and Cohen, W.; 1998), where collaborative filtering augmented by content-based properties is used to predict movie recommendations. The content-based properties were in a database and included personnel (i.e., actors, directors, and the like), genre, language, and length of the movies. Improved collaborative filtering results were achieved when the user database was segmented on the genre of movie favored by the particular user being served. Another example of a combined content-based and collaborative filtering recommendation system is described in "Combining Content-Based and Collaborative Recommendation," Communications of the ACM, (Balabanovic, M.; Shoham, Y.; 1997) (http://citeseer.nj.nec.com/balabanovic97combining.html). The Balabanovic and Shoham system uses content-based and collaborative filtering to learn user interest in Internet document fetching and recommends pre-fetch web pages for the user.

Problem Summary

Thus, it is apparent from the foregoing discussion that a number of product recommendation systems employing numerous techniques exist in the art. However, it is also readily apparent that present recommendation systems have significant shortcomings. For instance, many if not most of the products to be considered for a particular consumer may not have been used and rated by many other consumers thereby handicapping collaborative filtering based systems. Also, consumers often have great difficulty in knowing or determining whether some, all, or none of their needs are being met by a particular product he or she may be using. This is particularly true where the need being addressed by a product is characterized by an incremental response. Moreover, while existing systems may be helpful in some categories of products they are inappropriate where performance of the products being recommended is complex or even unknown. Placing a high value on the ratings patterns of other consumers, even though similar in a social-statistical sense, fails to address the likelihood that the consumers may have disparate underlying conditions and problems to be addressed by a product, and that the condition or problem being treated by the product may respond quite differently. In many categories the performance of products cannot be reliably predicted based on ratings patterns of other similar users, promises by the manufacturers thereof, or an examination of the ingredients or makeup of the products.

Accordingly, a need exists in the art for an individualized product recommendation system that does not rely primarily on consumer selection patterns but rather on product performance, optimized segmentation bases, and/or performance-based learning to render highly accurate product recommendations.

III. SUMMARY OF THE INVENTION

The present invention contemplates systems and methods of utilizing communications networks and recommendation processing operating on multivariate data characterizing consumers and products. The processing capability of the invention is based on intelligence contained in the processing computation design and algorithms. The data comprises subjective and/or objective product information received from consumers or input to the system as part of its initial setup and characterization of consumers that allows finding commonalties among the consumers in terms of similar requirements or responses. In one embodiment of the invention the data processing portion of the system receives input from consumers via the Internet. The output(s) of the system comprise sets of products that it predicts the consumer will prefer and/or perform well for the problem or concern identified by the consumer. Objective product information is generally obtained with diagnostic instruments that measure parameters having scientific relationship to human concerns regarding a target substrate and/or that correlate with subjective performance assessments. Data measured with the diagnostic instruments may be communicated to the data processing portions of the invention via the Internet. The diagnostic instruments may be interfaced directly to the Internet. The outputs of the data processing portion of the system, the product recommendations and/or ancillary information, may be presented to consumers via the Internet as well.

The data processing portion of the invention may include a neural network. The neural network is used to model the relationship(s) (typically non-linear) between the input variables of a served consumer's descriptive variables and the performance and/or preference responses of other consumers to products they have used in combination with the descriptive characterization of those consumers, and output variables of individual product performance and/or preference predictions. The neural network may be trained using actual product performance and preference data of a subset of a relevant population. It also may use as input product data (called product attributes) averaged over a group or segment of the consumer population along with a descriptive characterization of the group or segment to effectively reduce the complexity of the neural network. In certain embodiments of the invention the neural network is periodically re-trained through an explicit process of evaluation and optimization utilizing comparisons of predicted preference and performance versus actual preference and performance data collected from users of the invention.

Embodiments of the invention may utilize collaborative and/or content-based filters in the recommendation engine. Neighborhood formation in the collaborative filters may be based on a space composed of a plurality of items, including individual concern parameters, category target conditions, patterns of performance responses to products, product preference patterns, product preference issues, and the like.

Through objective and/or subjective feedback inputs, certain embodiments of the invention obtain data on the real world performance of products, the condition of the target substrates treated, and substrate responses to product use. Various embodiments of the invention use this information, aggregated from many consumers, to recommend products to other consumers having a basis for similar responses. The basis for similarity may comprise concerns and conditions on an individualized basis. The invention may obtain this information across a practically unlimited range of consumers and for any manufacturers' products. The invention is intended to be unbiased as to manufacturer identity or commercial intent, recommending products to a consumer based solely on the consumer desires in terms of performance, cost, preference, and the like.

The invention may periodically re-train its data processing portions to more accurately predict product performances and consumer preferences. When the embodiment of the invention utilizes re-training, as the numbers of consumers and multiple feedback entries accumulate, the invention acquires greater precision based on the real world experiences of those consumers. This added precision often allows the invention to differentiate between the products used in a given category, which may be of more value to a consumer than single product and small base size studies typical of commercial claim support and single product clinical trials. Where objective data is gathered, the invention may identify correlation or other relationships with consumer concerns to create performance response models based on the objective data.

Embodiments of the invention may collect data on consumer demographics and substrate needs, including consumer preferences for products, the current and historical condition of the substrate to be treated (e.g., consumer's skin), and responses of the substrate to current and historical product uses. For some purposes, such as creating information of use in category-related industries, the invention also may collect data on the mean effects of products within predefined or naturally clustering sub-populations of consumers called groups or segments. Segments are characterized by their similarity of needs or responses to products. In some embodiments of the invention, product recommendation can be formed on the basis of a consumer's characterization similarity to segment characterizations and the segments' average responses to products. Segments may be dynamically defined through re-training. Other embodiments generate data used for making recommendations on the basis of feedback responses to products among dynamically constructed consumer neighborhoods defined by collaborative filtering. Individual consumers also may have access to a variety of information concerning the performance of their current or historical products anchor obtain system predictions of performance and preference of hypothetical use of available products.

IV. BRIEF DESCRIPTION OF THE DRAWINGS

These and other features, aspects, and advantages of the invention will become better understood in connection with the appended claims and the following description and drawings of various embodiments of the invention where:

FIG. 1 shows a matrix that illustrates several principles associated with conventional content-based filtering techniques;

FIG. 2 shows a feature space that illustrates several principles associated with conventional collaborative filtering techniques;

FIG. 5 illustrates a query structure for gathering invention input from a consumer in accordance with an embodiment of the invention;

FIG. 6 illustrates a consumer database entry in accordance with an embodiment of the invention;

FIG. 7 illustrates in functional form how certain embodiments of the invention operate when diagnostic data is incorporated therein;

V. DETAILED DESCRIPTION OF THE PREFERRED EMBODIMENTS

Throughout the following detailed description similar reference numbers refer to similar elements in all the drawings. Also, embodiments of the invention are discussed and described herein for the most part in terms of skin care and skin care products. The invention, however, is in no way limited to skin care or skin care products. Rather, the invention is broadly applicable to a vast array of target substrates and product categories.

Exemplary Systems

Figure 3:
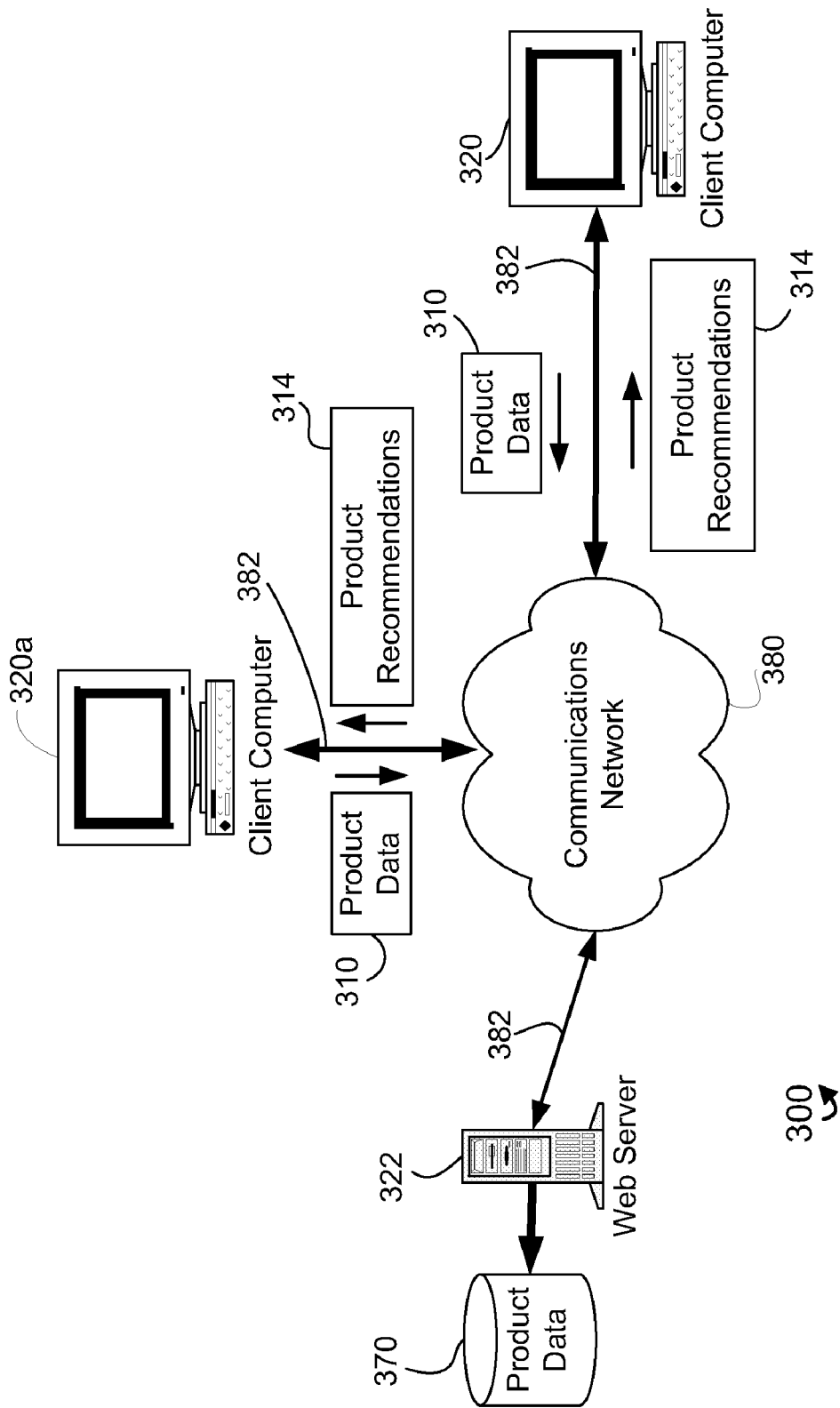
FIG. 3 illustrates a first exemplary network environment in which the present invention may be employed.
Figure 4:
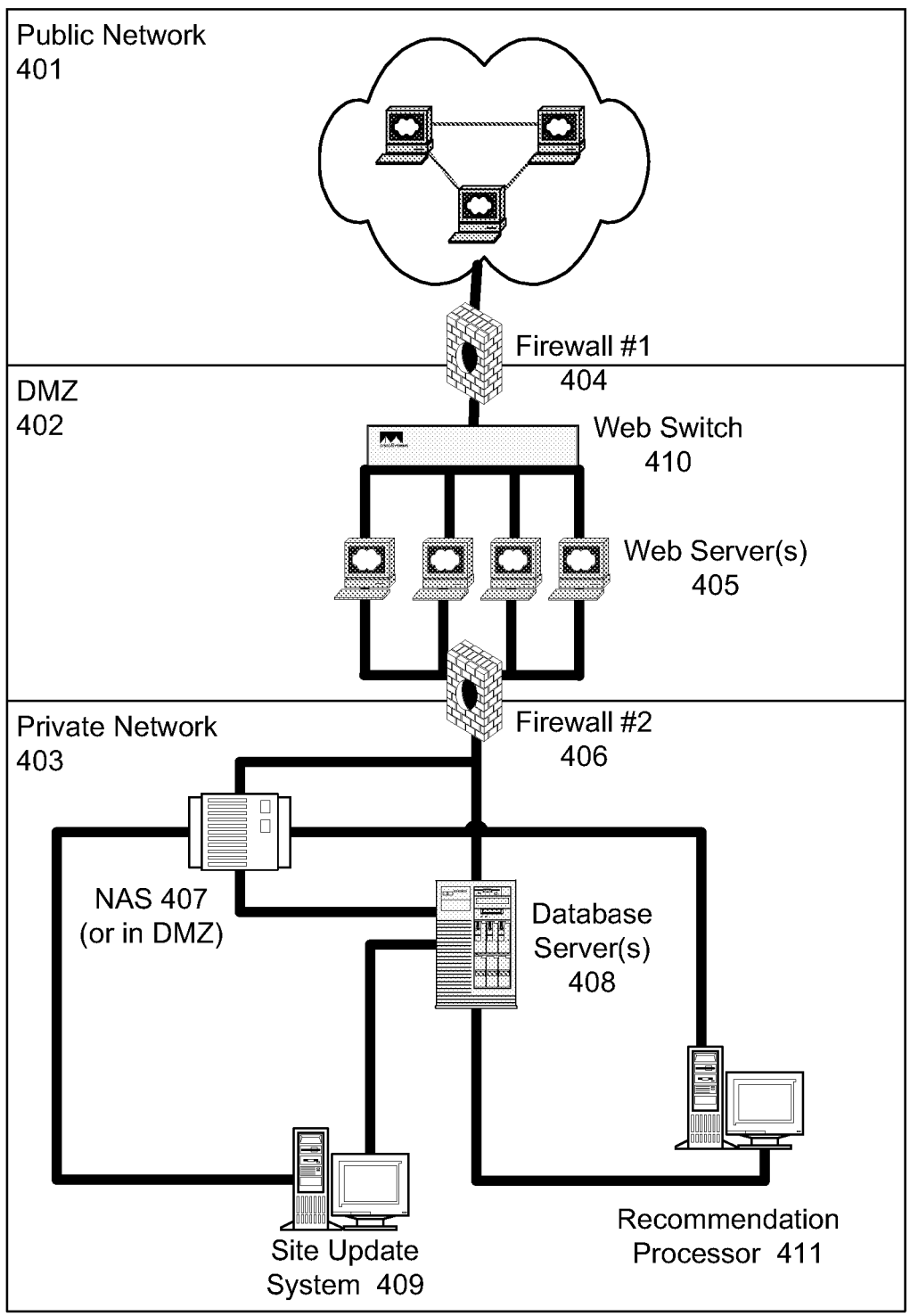
FIG. 4 illustrates a second exemplary network environment in which the present invention may be employed.

FIGS. 3 and 4 illustrate first and second exemplary network environments respectively in which the present invention may reside. Of course, actual network environments may be arranged in a variety of configurations and the invention is in no way intended to be limited to the embodiments depicted and described herein. The environment illustrated in FIG. 3 is that of a client-server system 300. System 300 includes client computers 320, 320a, which could be personal computers, thin clients, hand-held computing devices, and the like. System 300 also includes at least one server computer 322 and storage element 370 which is coupled to and controlled by server computer 322. The client and server computers in system 300 communicate with each other by way of communications network 380, which may comprise any number of networking technologies such as a LAN, a WAN, an intranet, the Internet, and the like.

Client computers 320, 320a and server computer 322 are connected to communications network 380 by way of communications interfaces 382. Communications interfaces 382 can be any one of the well-known communications interfaces such as Ethernet connections, modem connections, DSL connections, cable modem connections, and the like. Communications interfaces 382 also may comprise intermediate communications networks such as a LAN.

FIG. 4 illustrates a second exemplary network environment in which the invention may reside. System 400 is comprised of the three basic components forming commonly implemented architectures for serving web pages (or in general, Internet connectivity): the public network 401, a demilitarized zone ("DMZ") 402, and a private network 403. The purpose of separating the private network from the public network is to provide a predetermined level of information security.

In most embodiments of the invention the public network 401 will comprise the Internet. Because security threats typically reside in the public network a software and/or hardware device called a firewall 404 is placed along the connection point between the Internet and the private network. The firewall 404 blocks all traffic from the public network to the private network except for predefined types of messaging traffic such as web access to a defined set of web servers 405. The portion of the system 400 including the firewall typically is referred to as the DMZ because the resources it contains are only partially protected from outside access.

In certain embodiments of the invention another firewall 406 is placed between the DMZ 402 and the private (strictly internal) network 403. This second firewall allows access to the internal network only from machines in the DMZ utilizing a specific predefined type(s) of messaging traffic.

Static data to be served by the system can be placed in either the internal network or in the DMZ. Typically the static data is placed in the DMZ since it is often directly attached to the web servers. In system 400 however, the static data is stored on Network Attached Storage (NAS) 407 which resides in the private network zone. An advantage of NAS is that the storage has its own network address and hence the disks can be shared efficiently across multiple computers and is highly scalable. Static data may include, but is not limited to, content served when of interest to consumers, information and instructions, standard page formats into which individualized data, information and charts can be inserted, and the like.

Dynamic content (e.g., user-specific information) may also be stored in the NAS 407. However, because dynamic content is likely to be managed using a Database Management System (DBMS) such as Oracle or SQL Server system 400 employs a separate DBMS server 408 for dynamic content. Use of a separate DBMS server for dynamic content may also be necessary due to the processing requirements involved in the manipulation of data in system 400 and to further support database scalability.

System 400 also utilizes a site update subsystem 409. Site update subsystem may be used to update the static content of the web site as well as the content stored in the database. While depicted in system 400 as a function dedicated to a single computer, this is a standard web site update function and the specific update procedures and locations are matters of design choice.

Firewalls 404 and 406 may be implemented as either hardware or combination of hardware and software. Many firewalls today are implemented through software running on a relatively small server. Sun Microsystems offers many types of suitable small servers for this function and Check Point Software Technologies, Inc. offers a popular software package having suitable firewall functionality. An alternative configuration of system 400 may be implemented by having the firewall software residing on the small server perform the DMZ function as well, thereby eliminating the need for additional DMZ hardware.

The purpose of the web switch 410 in the DMZ 402 is to provide load balancing across the multiple web servers 405 within the DMZ 402. A web switch 410 may or may not be required in system 400. The selection of the web switch 410 and web servers 405 are matters of design choice and numerous vendors offer suitable platforms and packages. The recommendation engine processors 411 perform the processor-intensive off-line calculations needed to generate the individualized product recommendations. Selection of the recommendation engine processors is a matter of design choice as well.

In system 300, consumers use client computers 320, 320a to communicate subjective and/or objective data 310 to server 322. Server 322 then acts upon and/or stores the consumer data in data storage element 370. Server 322 uses the consumer data as well as other information stored in storage 370 to generate product recommendations 314 (as described more fully below). The product recommendations 314 are typically delivered over communications network 380 for presentation to the consumer at the requesting client computer 320, 320a.

In system 400, on the other hand, consumers transmit the subjective and/or objective data 310 to the web servers 405 within the DMZ 402 via the public network 401. The consumer data is then transferred by the web servers 405 to the various elements within the private network 403 as appropriate. The product recommendation processors 411, drawing on the consumer data, as well as other data stored on elements within the private network such as the NAS 407 and the DBMS 408, generate product recommendations. The product recommendations are then communicated to consumers via the DMZ 402 and public network 401.

The product recommendations typically comprise predicted product performance and product preference scores for a plurality of products for a particular consumer. In certain embodiments of the invention the recommendations are in the form of a custom constructed HTML document, a static HTML document into which custom constructed text, data graphics or charts are inserted, and the like. The HTML document also may include product package illustrations and information on the recommended products, as well as radio button options such as "add to my cart," "sample," "add to my reminder list", and the like next to each recommended product. A "rate this product" radio button also may be incorporated in the HTML document to permit the consumer to input his or her opinion of recommended products based on their historical use of the product. If a consumer has previously rated any of the recommended set poorly, the system may be programmed so that those products are excluded from a future recommended set for that consumer. In some cases the product recommendation engine determines whether the set of prior product responses indicates likely rejection or downgrading of other products that may be related on some basis.

Consumers also may request and/or systems 300 and 400 may deliver information in addition to the pure product recommendations. This ancillary information may cover any number of topics related to the product recommendations such as the needs of a consumer, and the like. Product recommendations and ancillary information will be discussed if more detail below in conjunction with system outputs.

The bases for the product recommendations may include, but are not limited to: a) descriptions of product attributes residing within storage elements in communication with the data processing or recommendation engine portions of the invention (e.g., storage element 370, NAS 407, DBMS 408, and the like); b) detailed information about each characteristic of a particular consumer's interests, including but not limited to his or her requirements, budget, aesthetic preferences, health needs, and/or need importances; c) other stored historical product data relating to the consumer's purchase patterns and past responses to products; d) similar information on some or all other consumers who have used the invention; and/or e) the product recommendation engine (which may utilize a neural network, a collaborative filter, combinations thereof, and the like) which infers the predicted performance and/or preference for products for an individual consumer based on the data and processing elements described above. Inputs and data incorporated within and utilized by the various elements of the invention will be discussed in more detail below.

The accuracy of the inputs to and outputs of the invention may be improved in a number of ways. One way is to include objective measures of substrate parameters that correlate with concerns of the consumers. These objective, physical measurements may be used to augment the subjective inputs (e.g., needs input variables and product performance ratings), or may even displace certain subjective consumer inputs altogether.

A second way to improve the accuracy of invention outputs is to periodically re-train the recommendation engine so that its outputs correlate more closely with data gathered by the system through consumer feedback. For instance, where the recommendation engine utilizes a neural network, predictions and actual consumer responses to product use are used periodically to re-train the algorithms residing in the hidden layers so that its future outputs (e.g., product recommendations) correlate more closely with the consumer feedback. Similarly, where the recommendation engine utilizes collaborative filtering one re-training optimization routine uses actual consumer feedback to refine the size of collaborative neighborhoods used if this is a fixed parameter, adjust the coefficients that scale each dimension of the collaborative space, and evaluate whether secondary collaborative filtering classifications such as performance or preference patterns improve accuracy of outputs.

Inputs

Inputs into the invention will now be considered. Query forms may be used to solicit the various inputs into the system from consumers. FIG. 5 illustrates an exemplary initial query structure. FIG. 6 illustrates some of the data that may be included in an individual consumer database entry within systems employing the invention.

In the initial or early interactions with a new consumer, the invention solicits personal profile information (e.g., age, gender, sleep patterns, medical conditions, prescription drug use, known allergies, geographic location, time spent outdoors, vitamin use, diet, and the like) and target concerns from the consumer. Personal profile information is gathered in certain embodiments of the invention because based on best knowledge of a category target's area of products research, such information may contribute to generating individualized product recommendations.

In general, when a consumer interacts with the invention he or she may be provided the option to either update his or her current needs, input product responses, obtain information content or ancillary information relating to a covered area, obtain information on their responses to products over time, and/or obtain recommendations for products in one of the categories covered by the invention. The latter three options are invention outputs and will be considered below. Consumer needs data is an invention input and may comprise subjective data about the condition of a target substrate. Subjective consumer needs data may also be augmented and/or supplanted by objective measurements gathered with diagnostic tools. Product responses are also system inputs and may comprise subjective and/or objective data regarding response of a substrate to whatever product the consumer is using whether previously recommended or not.

Upon receipt of product responses from consumers, the recommendation engine or processing associated therewith performs any number of operations on or with the data. For instance, and by way of example only, individual consumer profiles may be updated to include the objective and/or subjective data, modifications to various processing inputs such as consumer needs data may be calculated and implemented, and the like. The invention may also use product responses or feedback to: a) group consumers with similar substrate conditions; b) group consumers whose substrate responds better to the same set of products; c) group consumers whose substrate responds by a similar magnitude to the same set of products; d) measure the effects of products on substrate properties; e) compare the effects on a single consumer's substrate to the average effects seen in a population of consumers; and/or i) show consumers any changes that have occurred with use of a particular product or products over time. The use of feedback is discussed in greater detail below.

Consumers often have product choice biases based on aesthetic choices such as fragrance character or level, product form (e.g., cream vs. lotion, spray vs. rollon, and the like), genre of entertainment, hardcover or soft, and the like. Certain embodiments of the invention gather aesthetic choice information from a consumer because such information may provide a basis for an operator of systems employing the invention to check for product preference scatter depending on these biases. Where there are preference dependencies among consumers on the basis of such variables, certain embodiments of the invention may group an individual consumer with an appropriate class of individuals before calculating predicted product preferences and product recommendations.

In certain embodiments of the invention a consumer may have more than one concern or problem at a time regarding the target or substrate treated in a category of products (also referred to herein as a category target). Each concern for a particular target substrate is characterized in terms of the consumer's assessment of the concern's severity and/or importance. Typically, severity represents a subjective self-assessed level of the problem. In some cases however, severity may be assessed by others, and/or based upon measures of related physical properties or signs (e.g., diagnostic data). Importance typically is the degree to which a consumer is bothered or frustrated by the concern. Importance may also be thought of as extent to which the consumer would trade off benefits to meet their expectations from a product. (Hypothetical benefits of lesser importance would be sacrificed before benefits of higher importance.) The magnitude of severities and importances are preferred consumer characterization inputs for the system. The rank order of importances may be useful secondary consumer characterization inputs. Importance and severity are treated as independent factors in preferred embodiments of the invention.

A consumer's experience with a product also may be solicited. In certain embodiments of the invention consumer experiences are recorded in terms of preference and/or performance metrics. Solicitation of both preference and performance are preferred. Preference can be thought of as the answer to the question, "How much did you like using the product?" Preference should reflect the user's overall experience, and may include factors related to any perceived improvement in the consumer's various concerns, as well as more subjective aesthetic factors such as fragrance, ease of application, flavor, attractiveness of packaging, and the like. Performance should rate the extent to which a product reduced the signs or other conditions or symptoms associated with each concern in a category. While performance may comprise objective and/or subjective components, the inclusion of objective data is preferred. In situations where multiple products are used in combination by a single consumer, certain embodiments of the invention do not distinguish between the relative preference and performance ratings of each product but ascribe the ratings to all the components of the set.

Diagnostic data refers to objective data characterizing the state of a substrate to be treated by products in a given category. Substrates can be animate or inanimate, including an aspect of the consumer's person. In addition to diagnostic data, clients and/or their professional service providers may provide subjective characterization of substrate conditions and substrate performance responses to product use. Diagnostic data is obtained from a measurement tool(s) that measures a property related to a concern of the consumer. The property may be any physical property of the substrate such as size, mass, mechanical, electrical, optical, and the like. Bulk property examples from each of these categories could be length, weight, stiffness, resistance, opacity, and the like. Other properties relating to a substrate or feature within a substrate might include position, velocity, acceleration, vibration, rotational velocity, orientation, and the like. Surface properties of a substrate may include roughness, friction, reflectance, dryness, discoloration, and the like. Diagnostic data also may be based on chemical analyses. The specific properties measured by the diagnostic tool(s) will vary depending on the substrate being considered. Any time dependence of a measured property may be an important aspect related to a concern or consumers.

When properties of a substrate being considered are spatially non-homogeneous, the range or distribution of the properties may be captured by taking either randomly located repeated measures (sampling) or location specific measurements (mapping or imaging). Depending on the substrate attribute of concern, different functions of the distributed data correlate with the subjective or perceived attribute of concern. For example, where skin is the substrate and aged appearance is the consumer concern, wrinkle length could be measured from images of the face. Where the invention utilizes images the diagnostic tool may comprise a camera, including but not limited to, a digital camera. Diagnostic data for use with the invention may also be multidimensional, meaning a collection of measurements on one or more aspects of the target substrate. Collection of multidimensional data is achieved using a collection of devices, devices having multiple sensors, and/or combinations thereof.

Literature in the fields of psychometrics and objective measurements is extensive and may be consulted in formulating new functions of single or multiple diagnostic measures that correlate with various features of consumer concern and the desired effects of products in a category. In some cases though, it may be easier to measure the objective effects on the consumer rather than properties of the substrate. For example, where the consumer concern is "comfort of a bed" the relationship may be modeled by a complex function of optimal softness of the surface and stiffness of the support. Alternatively, one could measure directly on the consumer their time to fall asleep or hours of REM sleep and develop a model that relates this to the judged "comfort of a bed."

The parameters and/or sets of parameters to be measured with the diagnostic tools must be relevant to issues of consumer interest for a particular substrate. Multiple parameters can be communicated to the data processing elements of the invention individually or in combination. Alternatively, multiple parameters measured by a diagnostic tool(s) could be combined linearly and/or non-linearly at the client site to form an overall functional parameter that is communicated to the data processing elements on the server side of the system.

Only as many variables need to be measured as are necessary to formulate a reasonably predictive model of the consumer concern. In many cases, only a single variable selected from a plurality of options is necessary. Specific parameters and combinations of parameters that could be measured where the target substrate comprises skin, by way of example only, include the following. A consumer concern of skin dryness could involve any combination of surface reflectance, redness, skin moisture content (capacitance, conductance), skin barrier function (TEWL or change in moisture following wetting), friction, epidermal hyperplasia, skin flake image analysis, and the like. Skin lesion monitoring could involve any combination of size of specific lesions, color or specific lesions, and the body site of specific lesions. Skin solar exposure monitoring could involve any combination of basal skin color, pigmented spot color, contrast, and the like. Visible or ultraviolet light may be used to measure reflectance or fluorescence changes. Skin aging monitoring could involve any combination of skin color, skin color evenness, skin wrinkle length or depth, skin sagging, skin rigidity, and skin hydration.

Other specific parameters and combinations of parameters that could be measured where the target substrate comprises skin include: hair color, hair thickness, hair density, hair growth, acne lesion counts, acne lesion color, acne lesion rate of change, hyperpigmentation size and area, hyperpigmentation count, hyperpigmentation color, cytology of surface corneocytes (size, shape, and/or nucleation), electrical conductivity, capacitance, mechanical stiffness in the plane of the surface and/or perpendicular to the surface, friction, characterization of the fluorescence of skin, optical reflectivity as a function of color, microbial detection, optically based determination of distribution of pigmentation or photodamage, surface energy by contact angle, 3-D contour determination of sagging or bags under the eyes, redness, discoloration, and/or wrinkle depth and/or length.

Implementations of the invention incorporating objective data, like that discussed above, typically involve the use of diagnostic tools. These embodiments of the invention use diagnostic tools to obtain objective measurements that help dimension the needs levels of consumers (system input) and/or track the responses of a substrate to a particular product (performance feedback). An example of the former is objective data being used to adjust a consumer's subjectively assessed concern severity in one or more concern areas. Diagnostic tools typically are located at the client side of the communications network at a consumer's home, a service center accessible to the consumer, a physician's office, and the like. Utilization of diagnostic tools improves system sensitivity to effects of the products and provides objective data on the condition of the target to be treated by the product. The diagnostic data obtained with a diagnostic tool is communicated to the recommendation engine via communications network 380 (in system 300), public network and DMZ (in system 400), or other similar means of communication. The diagnostic tools and/or sensors employed therein to obtain the diagnostic data may require periodic calibration to assure continued accuracy. Calibration can be internal to a device, involve automatic adjustments when a calibration substrate is used, or be performed manually.

FIG. 7 illustrates in functional form how certain embodiments of the invention 700 may operate when diagnostic data is incorporated therein. Block 701 represents product attribute data gathered by the system of the invention 700 (or in the case of initial system startup, entered as priming data). Block 702 represents consumer needs data, objective and/or subjective feedback (such as diagnostic data), personal profile information, and the like solicited or gathered by the system from consumers using system 700. Arrow 703 represents the operation of the system's product recommendation engine (also referred to herein as the forward intelligence engine) on the system inputs (i.e., blocks 701 and 702 information). Block 704 represents the product recommendations generated by the product recommendation engine in arrow 703 and output 709 to consumer users of system 700. Block 705 represents the selection, purchase, and use of a product to treat a concern by consumers. Note, as a general matter the product selected and used by the consumers need not be one of the products recommended by the system 700, or even presently within the knowledge base of the system 700. Consumers may select and use any product they choose to treat a concern for which they have identified to the system 700 (e.g., block 702) and provide feedback about that product (e.g., 706, 707, 708). Block 706 represents the solicitation 710 of diagnostic measurements from the consumers. Blocks 707 and 708 represent feedback (e.g., new diagnostic measurements and subjective responses) received by the system 700 from the consumers and incorporated 712 within the knowledge base of system 700. Block 705 also represents the receipt and consideration of ancillary information output (e.g., diagnostic levels and trends) generated and delivered 711 by system 700 from the consumers.

While networked diagnostic devices have been described in the prior art, data collected by such devices has not been used in a product recommendation system. In the forward or recommending aspect of the systems for instance, the state or condition and any historical diagnostic responses of a substrate measured with the devices may be used to generate product recommendations. In the reverse or re-training aspect of the systems, the objective measurements of substrate responses to products may be used to re-train the product recommendation engine, which may include product attribute refinement, and/or to update consumer profiles. Compared to certain subjective assessments, measurements obtained with diagnostic tools often provide earlier and more accurate assessment of the effects of product usage. Objective data gathered with diagnostic tools may also reveal changes in important physical phenomenon otherwise unavailable to a consumer (e.g., changes in density of bacteria in or on a substrate, changes in pH level of a substrate, and the like).

For a personal or health care category the diagnostic measurement or multiple measurements might monitor internal or external properties of the consumer or the environment. For other categories of products the diagnostic tool may measure the condition or performance of an inanimate object. Ideally, the tools are made available at all times at the client site. The tools can output values that a consumer sends to the invention by email, data entry section of a web site, telephone, or the like. The use of diagnostic tools that are interfaced with a client computer or other electronic device located at a remote site (e.g., client site, kiosk location, professional service provider office, consumer service center, and the like) for automatic downloading of consumer data to the invention is preferred. In embodiments of the invention where a diagnostic device is remotely located from the data processing portions of the invention, the data processing portion of the system may perform all or most high level processing of the device's output to reduce the cost of the remotely located device. Diagnostic tools also frequently incorporate a standardization process.

Outputs

Attention will now be focused on outputs of the system of the invention. The primary output of the invention comprises individualized product recommendations in a particular category and regarding a particular substrate. In most embodiments of the invention, the product recommendations attempt to address all of a particular consumer's current concerns, and take into account both the severity and importance of each concern. Typically products are recommended based upon all known effects of the product and the consumer's interest in addressing a range of problems and tolerance or sensitivity to adverse effects, which are just additional rows in the concern matrix.

While certain embodiments of the invention explicitly recommend sets of products in which each product in the set is a specialist for a specific concern, the product recommendations generated by most embodiments of the invention are comprised of products in a category that best address all of a particular consumer's concerns, preferably taking into account their severity and importance. The latter approach is feasible because individual products are either designed or inadvertently affect many of the conditions (e.g., acne and oily skin) characterizing targets, and products generally address underlying properties or processes that have broad effects across concerns. When a product is part of a "packaged set" of products intended to be used in combination, certain embodiments of the invention make recommendations for such "packaged set" products as part of all categories that the packaged set covers.

With embodiments of the invention incorporating objective data, a particular consumer who does not provide objective data on his or her concerns, preferences, and/or the performance of products used may still obtain product recommendations based on his or her concerns and subjective preference and performance data. Such recommendations still benefit from the data gathered by the invention from other consumers. In these embodiments such users may or may not have access to other features of the invention based on or requiring objective data.

Underlying the individualized product recommendations are a plurality of personal utilities generated by the product recommendation engine for a given consumer. The personal utilities are unique and may include, by way of example only, scored predicted product performance utilities and scored predicted product preference utilities.

For scored predicted utility scores any number of meaningful scales may be used. In certain embodiments of the invention however, a scored scale of 1 through 10 is used where 10 represents the highest level of preference or performance and 1 represents the lowest level of preference or performance. The highest level of preference or performance is set by the system administrator in each assessed preference or performance category and may be unattainable by current products on the market. For example, in terms of performance for skin care products, in the area of moisturization a 10 might represent a high change in moisture levels in a single day while a 10 might represent a 50% improvement in 4 weeks in the area of wrinkle repair. Alternatively, the reported score may have a value that correlates with magnitudes a consumer uses for subjective assessment of product performance or preference. Certain embodiments of the invention utilize overall predicted performance utilities, which are detailed below in connection with data processing and the product recommendation engine.

The predicted personal utilities may be used by the system in various ways including, but not limited to, producing any one or more of the following: a rank order listing by utility of product options; a rank order listing by utility for a top-N set of products; a rank order listing by utility for a number of arbitrary products of interest to the consumer; a bar chart of utilities for products of interest; a personal utility score in a comparison display showing specifications on a number of products of interest to the consumer; and the like. Performance attributes for any set of selected or recommended products may be plotted versus the product price, including overall performance of the products.

Figures 8A, 8B, 9A, 9B, 10:
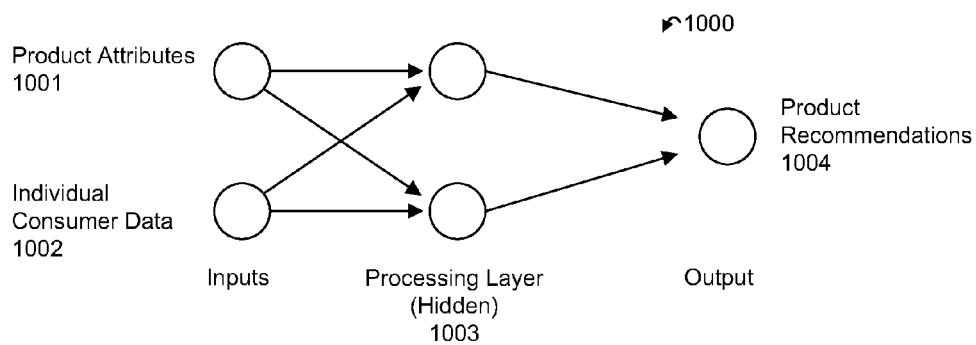
FIGS. 8A and 8B illustrate exemplary top-3 recommended product lists rank ordered by predicted product preference scores.
FIGS. 9A and 9B illustrate exemplary top-3 recommended product lists rank ordered by predicted product performance scores.
FIG. 10 illustrates in functional form how a product recommendation engine utilizing a neural network operates in accordance with an embodiment of the invention.

FIGS. 8A and 8B are exemplary output displays of rank order listings for a top-3 set of products by scored predicted preference. FIGS. 9A and 9B are exemplary output displays of rank order listings for a top-3 set of products by scored predicted performance. Note that even though the displays illustrated in FIGS. 8 and 9 are rank ordered by predicted preference and performance, respectively, each of the displays also present predicted performance and preference respectively for each product in the display. Both utilities need not be presented to consumers together in the same display. Note also that the displays depicted in FIGS. 8 and 9 include a lowest known price for each product listed. Presentation of this information is optional.

Another output provided by the invention may comprise ancillary data or information. Displays of a consumer's condition based on the diagnostic and/or subjective data collected by the system may communicate to the consumer how the consumer's needs compare to a relevant population, the awareness of the system of their specific needs, how they have responded to specific products over time, and the like. Graphics may indicate which products were being used by a consumer at different periods of time as well as trend data.

Another form of ancillary information output comprises explanations of why certain products were recommended. For example, performance prediction metrics may be explained by querying the invention with a radio button or other appropriate interface and the invention could respond by providing a table of concern areas ordered by the consumer's importance and/or performance scores for the particular product being considered for each area of concern.

Where the product recommendations generated by the invention are delivered to a consumer who has Internet connectivity, the consumer may act on the recommendations by ordering or purchasing one or more of the recommended products via the Internet. For instance, links to an ordering function incorporated in the invention or to another possibly allied distribution company may comprise ancillary information output from the invention.

Ancillary information output also may include: links to product reviews from consumers with similar substrate needs; directed content based on the consumer's problem segmentation; information regarding the condition of a consumer's substrate within a historical framework to show responses to use of the invention or use of particular products or product classes or periods of any particular underlying behavior; information regarding the condition of a consumer's substrate relative to peers or a relevant population (demographic positioning could be reported within local geographic or limited ethnic or age limits); information regarding changes resulting from new product usage or regimens through images with or without sensitivity enhanced relative to general perception; information regarding the dependence of results on usage practices such as frequency of use or use of associated products or practices; comparison information that aids a consumer in subjectively assessing performance of a product (e.g., before and after images of a substrate of concern); and the like. Other ancillary information could include interactive and/or multimedia applications and/or displays. For instance, an interactive and/or multimedia application could: guide a consumer through the proper use of a recommended or selected product; aid a consumer in assessing the performance of a product; and the like. Interactive and/or multimedia applications and/or displays may include text-based chat rooms, video-based chat rooms, streaming media, virtual help, agents, interactors, and the like.

Many targets, for example health based substrates (and in particular the skin) change and age at slow rates. Other target substrates also may respond to products over relatively long timetables. Therefore, over short time frames the desired effects of products may be subtle and difficult to discern. Thus, another form of ancillary output that may be provided in certain embodiments of the invention are progress indications. Progress indications, where possible, may enable consumers to better judge product performance, provide an aid to memory, provide earlier decision making on product suitability, encourage compliance with effective products, and/or discourage continued use of ineffective products as soon as possible.

With progress indicators, as a consumer uses a product he or she may view the effects of the product on the category target (e.g., skin properties, lung functions, and the like). Tracking may be provided for individual conditions or for an overall condition, in analogy to the overall performance discussed below. Where provided, condition is calculated from data that is being tracked at home or with the help of professional service providers. In some cases, a condition may be based on subjective feedback. For instance, the data may include subjective feedback on current severity of each concern of the category, it may be based on a set of questions about assessable attributes of the target, and/or utilize objective diagnostic measurements. Preferred embodiments utilize at least some form of objective diagnostic measurements. For each of i concerns, the data processing architecture of the invention produces a current condition$_i$. The condition$_i$ may be any model of the data obtained by the invention related to concern$_i$.

Preferred embodiments of the invention provide progress indicators because communicating any change in a condition together with typical or expected changes helps build realistic consumer expectations of product performance and effects. Possible displays include a curve representing the average change in condition for consumers starting with condition levels similar to the given consumer, and data points or a curve fit to the data for the given consumer. To illustrate, the typical change curve for consumers within a normal range of that condition might be flat, whereas a typical change curve for consumers one sigma deviation from normal might show improvement occurring over a certain time scale ($t_{1/2}$).

Data Processing

The details of the forward intelligence or product recommendation engine will now be provided. As discussed above, one of the possible outputs of the invention comprises product recommendations. The invention generates its recommendations through the use of a product recommendation engine that performs multivariate modeling and analysis of the independent variable inputs it receives from consumers. Depending on the embodiment of the invention implemented, the product recommendation engine may utilize any combination of the inputs discussed above to produce any combination of the outputs discussed above. In certain embodiments of the invention, the product recommendation engine utilizes one or more neural networks to generate outputs from the inputs. In other embodiments of the invention, the product recommendation engine utilizes a collaborative filter or combinations of multiple collaborative filtering models to produce its outputs. In still other embodiments of the invention, the product recommendation engine utilizes combinations of neural networks and collaborative filtering to process the system inputs.

Data Processing: Collaborative Filtering

Any collaborative filter has at least three main elements comprising data representation, neighborhood formation function, and recommendation generation functions. Each will be discussed separately, beginning with data representation.

Certain inputs and outputs are numerically represented for use by the product recommendation engine. As discussed above, products address the needs of consumers and in general have a range of types of effects. Consumers communicate concerns in a product area in terms of the severity of their needs (or sensitivity to adverse effects) and how important they consider these concerns to the product purchase decision. Depending on the target substrate, a plurality of concerns may be relevant. In certain embodiments of the invention concerns are presented for the consumer to choose from. This simplifies the dimensionality of the consumer's interactions with the invention to just those concerns they have chosen to address.

Exemplary concerns, where the category is cleansers and the target substrate is skin, might include cleaning dirt, cleaning grease, killing bacteria, irritating skin, drying skin, imparting a tightening feeling, leaving skin feeling soft, lathers easily, economical, smelling pleasant, and the like. In general, there are i concerns in a given category. While the target of the category may be the only substrate considered in concerns, multiple substrates could be involved. For example, in this category the main substrate is skin, but how the product leaves a film on the tub addresses a secondary substrate. Associated with each of the i concerns is an importance level. A new consumer (or an existing consumer wishing to revise his or her personal data) interacting with the invention typically identifies concerns, levels for each of the concerns, and how important each concern is in the product selection decision. A new consumer may also be asked to identify sensitivity to adverse product effects. An aided scale, where some input values are described by words and/or pictures, may be utilized in the data collection process. Other input devices such as slides or dials or image synthesis and the like are envisioned.

A user's Concerns are represented by a N×2 matrix, $_uC_{ik}$, where: u is an index representing the consumer (which may be dropped for convenience in the following); N is the number of Concerns recognized by the invention; i=1,N; k=1,2; $C_{i1}$=Severity of $i^{th}$ Concern, $0<=_uC_{i1}<=10$; $C_{i2}$=Importance of $i^{th}$ Concern, $0<=_uC_{i2}<=10$. Each concern Ci is typically known to the user by a descriptive text name (e.g., wrinkles, dryness, pimples, and the like). A 0 to 10 scale used for each element of the concern matrix is, of course, arbitrary.

Although concern severities and importances are generally subjective assessments, in the case of certain concern areas (e.g., where the quality of subjective information is notorious) the subjective assessments may be augmented and/or supplanted with objective data. In certain embodiments of the invention scaled objective data (e.g., a measured variable) may stand in for a concern or a concern input may be restricted or modified by virtue of the objective data. For example, where skin is the target substrate, skin roughness, photodamage index, and/or elasticity (turgor) may be relevant to scaling certain problem severities provided by a consumer. The objective data and/or scaled values may be used to extend the range of concerns, to add a new concern to the category target concerns, or modify existing concern severity values (e.g., by using a linear combination of the subjective and measured values related to a specific concern). For example, a consumer may assess wrinkling severity and the invention may weight the consumer's subjective assessment by a machine value for total wrinkle length. Data from within a consumer's personal profile such as age or time outdoors may also provide relevant information and be used to adjust concern parameters.

Numerical representations of each measured parameter are chosen so as to reflect the method of measurement in a convenient fashion. Each severity score, $C_{i1}$, is a real number in a predefined range, for example, between 0 and 10. The computation that relates measurements or relevant signs or other material properties to $C_{i1}$ is structured so that the most severe case of concern $C_i$ is given the highest score (e.g., 10), while the lowest score (e.g., 0) corresponds to a lack of any reported or observable signs or physical indications for the concern.

The importance of concern $C_i$, called $Ci_{i2}$, is represented as an integer in a finite range, such as the range 0-10, and the like. Note that in preferred embodiments of the invention importance values are not normalized because relevant information is often contained in their absolute magnitudes and should be preserved.

Turning to representation of preference data, as consumers use products they provide preference feedback on those products. In addition, new consumers may provide preference values for products they have used in the past, for example in their initial interaction with or early in the process of starting to use the invention. As discussed above, preference is a measure of how much the product is liked. A variety of aided scales may be provided. Table 1 shows an exemplary aided preference scale.

TABLE 1

| 1 | 2 | 3 | 4 | 5 | 6 | 7 | 8 | 9 | 10 |
|---|---|---|---|---|---|---|---|---|---|
| very inferior | | worse than most | | average | | | better | better than most | best |

All aspects of a product typically impact a given consumer's preference for that product, including how well the consumer thinks the product works. In other words, preference values may be influenced by the aesthetics of a product, the perceived performance, and/or marketing information. Consumers may also be influenced by system participation, potential invention outputs such as the recommendation of a product on the basis of predicted preference, predicted performance, and/or performance tracking information provided to consumers. For this reason, in preferred embodiments of the invention once a new consumer has evaluated five or six products recommended by the invention his or her initial or pre-invention use preference values are eliminated from that consumer's preference pattern data.

A consumer's preference score for a given product, $_{up}$PREF, (u=user index, p=product index) is represented in the system as an integer in a finite range, such as the range 0-10, or 0-100, and the like. A consumer's preference score for a given product also should correspond to the rank-ordered set of preference descriptors.

Where the basis for collaborative filtering is finding a neighborhood of similar product preference patterns, it is the pattern of preferences across a range of overlapping products used by consumers that determines similarity among consumers. To improve predictions of product preference, certain embodiments of the invention apply preference based collaborative filters after concern based collaborative filters are applied to subset the population to those with similar target problems.

Representation of target or substrate conditions is now considered. Performance predictions and feedback are derived from data that tracks individual conditions of the target substrate for a given category. In preferred embodiments of the invention each condition is an objective index of the current properties of the target substrate that relate to each of the concern areas. Condition values are ideally calculated from a set of primary measurement variables. However, in some cases condition values may be based on a combination of one or more of subjective feedback on current severity of concern of the category (e.g., itch where the target substrate is skin), subjective feedback on a set of questions about specific assessable attributes of the target substrate (e.g., number of cracks on the hands, the minutes of skin feeling tight, and the like where the target substrate is skin), and objective diagnostic measurements. For each of the i concerns, data processing produces a current condition i. Conditions may be any model of the data obtained that reflects concern. Whether the model correlates linearly with perceived severity is not necessarily relevant. To illustrate the concept further, consider tires as a product category. Concerns related to tread wear could be mileage or remaining tread. Measurements of tread depth and odometer miles could be converted to conditions of the tire related to the concerns as follows: tire mileage condition= (change of odometer miles)*(original tire tread depth)/ (change of tread depth); remaining tread (in miles)=milage* (remaining tread depth-minimum safe tread depth)/(original tread depth). Conditions characterize the state of the target in a way that directly relates to the consumer's concerns.

When characterizing performance of a product with preferred embodiments of the invention, all conditions data obtained while a consumer is using a product is stored until the use of the product is completed and the performance feedback of the consumer for the product is decided. The initial and final values of the conditions data are stored as a part of the consumer databases in preferred embodiments of the invention as well.

Representation of performance, overall performance, and performance pattern data within the invention are now considered. As discussed above, conditions are characterizations of a target or substrate at a point in time. Since starting use of the product, the change or rate of change of Condition$_i$ are possible measures of performance. The precise scale used to numerically represent such data often depends on the characteristics of the particular data being considered. In preferred embodiments of the invention however, a positive or negative 0-10 performance scale is employed. In certain embodiments of the invention a predetermined value of change is assigned to particular values on the performance scale. For example, where a 0-10 performance scale is utilized a predetermined value of change may be assigned to the values 0, −5, −10, 5, and 10 on the performance scale.

The change of condition is the difference in the value of condition averaged over readings obtained in some fixed time intervals. Exemplary intervals may be the two weeks preceding start of product use and 8 to 12 weeks after start of product use. The precise intervals for sampling and initial product effects assessment selected however will necessarily depend on the product category and associated target. In preferred embodiments of the invention the change of condition value is the difference between the value of condition averaged over a sampling time interval beginning some defined time period after start of use less an initial condition (which may or may not be averaged over some initial time interval, perhaps during the week preceding start of product use). Rate of change of condition could be the fit slope of the condition over some defined time interval, for example the first two months of product use. The target substrate's change kinetics, typical product effect kinetics, and the specific condition are factors that may be considered in deciding how condition changes are translated to a useful performance score.

Once appropriate time intervals are selected, an appropriate translation function is selected to arrive at a performance score. Translation functions may comprise any number of functions including, by way of example only, linear translation by formula, nonlinear translation by formula, and/or a lookup table. The process of selecting a translation function may begin by looking at the distribution of condition changes across all products and a large number of consumers so that the distribution of changes may be translated to performance scores. An exemplary translation may have the top 10% of changes correspond to a 10 on a performance scale of 0-10 while average results correlate to a 5. A tool helpful in performing the foregoing is a two dimensional map of distribution of condition changes as a function of initial condition. A model of performance score based on amount of change and initial level of a condition is often preferred.

Performance of a product for a given consumer preferably is computed for each concern Ci using the observed change of the condition and the level of the consumer's initial concern, $_{up}PERF_i$, (where 'u' and 'p' are indices referencing the consumer and product respectively and i is the condition index). The overall performance score for the product, $_{up}PERF$, typically is computed as the importance weighted sum of the each concern Ci using the observed change of the condition and the level of the consumer's initial concern, $_{up}PERF_i$, (where 'u' and 'p' are indices referencing the consumer and product respectively and i is the condition index), normalized by the sum of importances.

In the case of biological target substrates, measurable or assessable signs are an alternate terminology for certain properties of the target substrate. In this case change in condition is determined by change in the signs. Optionally, performance metrics at the level of the signs can be utilized with the invention.

For a particular consumer, an overall performance prediction may be presented as part of the product recommendations output. Overall performance prediction may characterize the "predicted performance" of a top-N performance recommendation listing output, and also may be reported in other formats of recommendation outputs. Overall performance predictions use the predicted performance for each concern derived from the observed performances seen by consumers similar to the consumer (such as those in the consumer's collaborative neighborhood, in certain embodiments of the invention). The overall performance prediction is the consumer's concern importances ($C_{i2}$) weighted average of the product performance predictions (normalized by the sum of the importances.)

In certain embodiments of the invention, a performance response pattern comprises a rank ordering of product performance results in a single concern area or overall for all the products the consumer has used and provided feedback to the invention. This rank order allows grouping of clients with similar response patterns versus different response patterns. In certain embodiments of the invention separation of the population of consumers into different response pattern classes is performed when doing so reduces the standard deviation of performance for that concern for the subpopulations versus the entire population. If performance response pattern is a valid predictor of performance, consumers may be clustered or a secondary collaborative neighborhood may be defined on the basis of performance response pattern for the set of relevant products. This is done to separate targets with common response mechanics from targets having alternative response mechanics.

Personal profile information may be represented numerically also. As discussed above, personal profile information may be relevant to the condition and concerns of a target substrate in a particular product category. A consumer personal information vector, $_uPI$, may be constructed whose components correspond to the personal profile data in a fashion that will enable $_uPI$ to be used in computing or filtering a similarity group (also referred to herein as a collaborative neighborhood).

Psychographic or personality markers may also be assessed and represented numerically as they are often determinants in product purchase decisions and may manifest effects on product preferences. Psychographic markers are more likely to be advantageous in embodiments of the invention employing neural network analysis than collaborative filtering.

The second main element in collaborative filtering is neighborhood formation. Techniques for defining a subgroup of consumers that are similar to a given consumer are now defined. Any set of data that will be used to establish consumer neighborhoods comprises a space that is a multidimensional representation of the consumer population. In analogy to the distance between two points in ordinary space, a generalized distance between any two consumers (consumer j and consumer k) in the relevant space is defined as:

$$d_{jk} = \sqrt{(\Sigma_i a_i^2 (\Delta P_{ijk})^2)} / \sqrt{(\Sigma_i a_i^2)} \qquad \text{(Eqn. 1)}$$

where $\Delta P_{ijk}$ is the difference in consumer j and k's values of the ith parameter used in the consumer space, and $a_1$ is a coefficient that scales the various parameters. In preferred embodiments of the invention the distance is normalized. Normalizing stabilizes the distances as different parameters are considered as part of the consumer space and coefficients are scaled, stretching the space in various ways to test for narrower prediction distributions in spherical neighborhoods (all consumers within a fixed distance from a particular consumer). This criteria is equivalent to improving the precision of predictions. The smaller the distance used to limit the size of the neighborhood the tighter the prediction distribution. On the other hand, the smaller the distance the fewer values there are for a given product, thereby running the risk of hurting accuracy. The coefficients $a_i$ should be chosen so that all dimensions (adjusted parameters) have similar effects on the spread in prediction distributions.

Ideally, "similar" means consumers that have similar preference and performance outcomes to product usage. In some embodiments of the invention the definition can be directly implemented so that the parameters P in Eqn. 1 include the performance and preference scores for products and the distance is based in part on the similarity of these parameters wherever there is usage data for a common product. In this scheme, the distance between any two consumers involves a different number of dimensions. The normalization denominator in Eqn. 1 can account for this. However, the number of shared products should be recorded and when there are not adequate overlap in product use to establish a confident determination of similarity, the other consumer should be excluded from a given consumer's neighborhood. It is beneficial to allow more consumers in the collaborative neighborhood so that more product recommendations can be made with greater confidence. For this reason, a preferred embodiment of the invention uses similarity in concerns and other consumer characterizations to establish a sizable, relevant neighborhood or recommenders.

In this model, all consumers are available for membership in neighborhoods because usage of products in common is not required. The parameters used to position each consumer in a space are formed from combining any or all of concern severities, concern importances, target conditions, personal profile information, and aesthetic choices. Dimensions of the space may also be constructed from various ratios or products of these consumer characterizations. The similarity group for a given consumer user is then defined as the set of other consumers within a limiting distance from the consumer being served in this space according to Eqn. 1. The limiting distance may be adapted for each consumer and product being considered for predictions of performance and preference, so that a statistically appropriate number of "similar" product users are captured. For example, as the number of system users grows, the threshold could be reduced while maintaining the same average number of similar consumers. When a preference or performance based similarity dimension can be constructed this can be combined with the consumer characterization based space described herein.

Aesthetic choices, discussed above, are a subset of personal profile information concerned with preferences for specific forms of product within a category. Preference patterns often are strongly influenced by one or more aesthetic choices. Thus, in certain embodiments of the invention a consumer's predicted preferences are derived at least in part from a neighborhood of consumers additionally filtered to have the same or similar aesthetic choices. For example, where the product category is cleanser and the target skin, a consumer who prefers bar soap over a shower gel would not be interested in a shower gel preference-based recommendation. The invention nonetheless may still present a shower gel in a top-N performance list because a consumer may still want to know that a high performance predicted product is out there even if in a less desired form. A neighborhood may be defined so that it is large enough to generate all of the recommendation values (predicted performances and preferences) that are needed for a session with a particular consumer. In certain embodiments of the invention a neighborhood limiting distance can be a constant for any given consumer. In preferred embodiments of the invention though a limiting distance can be selected for each consumer based on the density of consumers in the region of the consumer space where the particular consumer is located. The latter embodiment allows a larger limiting distance to be selected when a consumer is located in a region of the consumer space that is sparsely populated. Even more precision in the predictions may be achieved if the limiting distance is adjusted for each consumer and for each product considered so that every prediction uses the smallest possible limiting distance. There are computing costs associated with the foregoing and subtle effects on the precision of comparisons because a different group of consumers is involved for each product's predictions. Products without sufficient statistical support (too large a variance or too few instances of use) may be culled.

The consumer space may be constructed in a number of ways, and a single embodiment of the invention may use one type of space to generate product recommendations for certain consumers and other types of spaces (e.g., using different parameters) to generate recommendations for other consumers. Commonly, the space for preference predictions will involve different dimensions than the space used for performance predictions. Note though, in each case the space should be filled with every client in the system. Exemplary though narrowly defined spaces that may be employed in the invention include, but are not limited to: needs-based spaces, responsiveness spaces, preference spaces, and the like. In each case, the space can involve dimensions that go beyond the title limitations. Furthermore, the use of compound spaces which add the characteristics of two or more of these simple spaces are within the scope of the invention.

In a needs-based space, concern severities may be the majority of dimensions. Another space may be formed with the product of importance and severity data, which may be referred to as a needs gap space. Each space may add personal profile dimensions or any other parameters that improve the quality of predictions when compared to feedback.

A responsiveness space is based primarily on conditions or changes in condition recorded for standard products or classes of products. A responsiveness space might be employed where the target substrate is medical in nature and it would be helpful to group consumers. Response patterns are described above. In the case of medical targets response patterns identify consumers on the basis of underlying biological mechanisms.

A preference space may be particularly useful for a product category where a relatively large number of products can be sampled and consumers can provide definitive preference information. Where consumers also provide objective feedback on the specific performance factors, detailed performance predictions can enhance consumer purchase choices. An automobile product category is well-suited for use of a preference space. A preference filter may let a consumer who likes certain types of vehicles, best expressed by the set of vehicles that fit this class, see that other consumers with similar tastes also like a few models the client is not familiar with. Real world consumer generated data on aspects of vehicle performance that could aid the consumer in selecting one or more of the recommend vehicles would be provided in certain embodiments of the invention.

The third main element of a collaborative filter comprises the recommendation generation function. Given a consumer and the set of similar consumers (i.e., neighborhood), product recommendations for the given user are made. Once the dimensions or coordinates of the collaborative consumer space are selected and the size of the collaborative neighborhood defined, preference and/or performance scores are calculated for every product in the category for the given consumer. The scores may be sorted, and then used to define a top-N list of predicted preference products, where N is the number of product recommendations presented to the consumer.

Overall performance prediction scores often are more complicated than preference scores because they are generated from a performance matrix, a one dimensional matrix for each product predicted for each consumer. There is a performance component for each concern topic. For each product in the category, the average performance matrix is calculated over all consumers within the collaborative neighborhood. Typically, filtering is not done for aesthetic choices. Filtering however may be performed for other personal profile information factors used in the preference prediction. In preferred embodiments of the invention overall performance for a single product for consumer k ($OPP_k$) is the consumer's importances ($I_i$) weighted average of the elements of the performance matrix. Or, in equation form:

$$OPP_k = \Sigma_i I_{ik} P_i / \Sigma_i I_{ik} \quad \text{(Eqn. 2)}$$

Overall performance scores may be sorted, and then used to define a top-N list of predicted performance products. In preferred embodiments of the invention the OPP scores are reported for products in a top-N preference table as well (when available).

Data Processing: Neural Network Analysis

Certain embodiments of the invention utilize a neural network to generate its recommended products. The neural network is used to model the relationship between various inputs, such as consumer characterizations and consumer feedback, and various outputs, such as product performance and preference predictions. Each consumer typically has a range of one or many needs to be addressed.

The input variables may include client personal profile information, preference and performance values for previously used products, concern matrices (typically including severities and importances), and conditions which are psychometric models of assessments or measurements of target attributes that relate to concern areas. As consumers use products recommended by the invention, their individual preferences data and performance matrices for products used accumulates additional data.

As discussed above, given a consumer's set of input parameters, inputs from other consumers who have used and provided performance and/or preference data, and a trained neural network, the product recommendation engine uses the neural network to generate predictions of performance and/or preference for products which have been used by other consumers, but not necessarily by this consumer. Product recommendation output forms for the given consumer (typically in the form of performance and preference predictions contained in custom constructed recommendation tables) are easily generated from the sorted predictions.

In preferred embodiments of the invention the predicted performance score comprises an overall performance score derived from a performance array for each product recommended to a consumer. Typically there is a performance prediction for each concern identified by the consumer. For each product in the category, the performance matrix is output based on the neural network's model for each performance parameter. The overall performance prediction ($OPP_k$) for a single product for consumer k is computed in the same manner as with a collaborative filter, discussed in detail above. Overall performance scores may be sorted, and then used to define a top-N list of predicted performance products. In preferred embodiments of the invention the OPP scores are reported for products in a top-N preference table as well (when available).

FIG. 10 illustrates in functional form how the product recommendation engine 1000 operates in an embodiment of the invention that utilizes a neural network and the neural network utilizes product attributes as inputs. Product recommendation engine receives as inputs product attributes 1001 (derived from all the system knowledge about products used by consumers or, upon startup of the system, priming data) and an individual consumer's characterizations record or profile 1002. The processing or hidden layers 1003 of operate on the inputs 1001, 1002 to produce product recommendations outputs 1004.

Data Processing: Hybrids

Where the recommendation engine of the invention utilizes collaborative filtering as described above, neural network analysis can be used to improve the function/performance of the product recommendation engine. For instance, and by way of example only, the output (e.g., predictions) from the collaborative group can be processed by a neural network, or a neural network may be used to generate early predictions of whether a product is likely to not be beneficial.

As discussed above, filtering of collaborative neighborhoods on the basis of aesthetic choices and/or other personal profile information may tighten the standard deviation of the distribution of preferences averaged within the collaborative neighborhood to provide a consumer a more accurate prediction. After collaborative filtering to a consumer's neighborhood in client space, a neural network may be trained to select those consumers most likely to match the responses of the consumer being served. In embodiments of the invention that periodically examine the quality of predictions, the neural network operating on all available inputs can find better predictive models for each output parameter. An embodiment of this invention might use collaborative filtering techniques for performance prediction generations and neural network methods to generate preference predictions. In this variant of the invention, the predicted performance data could be an additional input for the neural network generating preference predictions.

Figure 11:
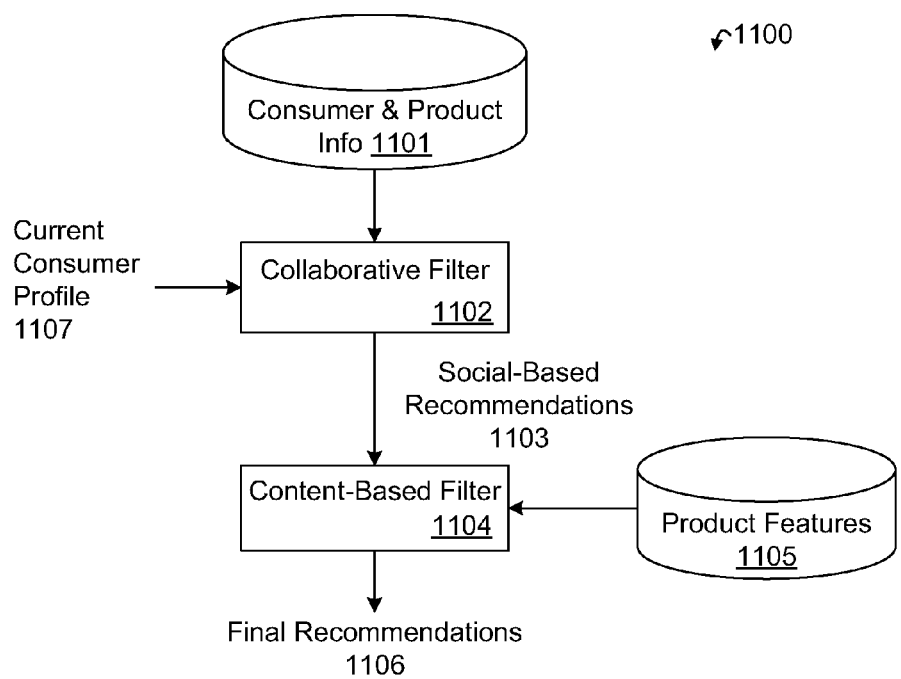
FIG. 11 illustrates a cascade of collaborative and content-based filters that may be employed in a product recommendation engine in accordance with an embodiment of the invention.

Yet another hybrid data processing model that may be employed combines collaborative and content-based filtering. FIG. 11 illustrates a cascade of collaborative and content-based filters 1100 utilized in certain embodiments of the invention. Cascade 1100 represents a novel approach to exploiting both social and content information that is particularly well suited to the present invention. With this cascaded architecture 1100, the collaborative filter 1102 is tuned to output predicted ratings 1103 for many products based on a current consumer's characterization profile 1107 and the knowledge regarding all consumers and products contained in database 1101. Ratings outputs 1103 then form the input to content-based filter 1104, which selects products from those inputs for which the product features stored in the product features database 1105 match well with the user's aesthetic choices contained in the personal profile information. The products selected by content-based filter 1104 comprise the final recommendations 1106 output by the product recommendation engine.

Data Processing: Database Priming

New products may be introduced into the system in a variety of ways. Consumers may enter feedback data for a product that is not yet in the system by entering appropriate product identity information. Though the system will not generate recommendations for the product until adequate feedback is available, it will continue to accept feedback from users. The system may utilize methods to enable faster recommendations of a new product which we refer to as priming. The product database may be primed with synthetic and/or actual historical inputs and feedback. In systems using product attributes, that is, performance data representing the mean performance for each consumer segment, the priming data may incorporate product attributes assigned by experts in the field. The priming data would be diluted out rapidly by actual feedback of the new product. Alternatively, performance and/or preference data on a new product could be obtained from recruited sets of well characterized users, or the like. Over time, as consumers use the new product, current data is assembled and priming product attributes and/or product performance and preference data are adjusted or diluted in conformance with the assembled data. When enough records of system based use of a product are accumulated, the priming data may be eliminated as it is likely inferior to the system-based data. Re-training is discussed in more detail below.

Re-Training and Feedback

Re-training of the product recommendation or forward intelligence engine will now be considered. Certain embodiments of the invention improve their recommendation quality over time by periodically re-training the product recommendation engine based on consumer feedback. In particular, preferred embodiments of the invention utilize preference and performance ratings received from consumers after using products to periodically assess the precision and/or accuracy of product recommendations generated by the invention. The data processing algorithms of the invention are re-trained to reduce the differences between actual feedback and earlier predictions. As the density of data increases the optimal weighting functions and spatial structure may change. In this way, the outputs of preferred embodiments of the invention continually improve as the population of performance and preference feedback data grows. Accordingly, another form of ancillary data output by certain embodiments of the invention may comprise recommended feedback intervals.

Accuracy is some measure of the agreement of each consumer's predicted performance and/or preference values with feedback regarding these parameters from consumers after using the products. Improving agreement amounts to minimizing the sum of the differences (prediction less feedback), or minimizing the sum of differences squared, and the like. Adjustments may include changing the spatial dimensions or their scalar weightings in a collaborative filtering space, filtering neighborhoods by additional personal profile information variables, re-training a neural network, applying better neural network models to the predictions from collaborative filtering models, and the like.

Figure 12:
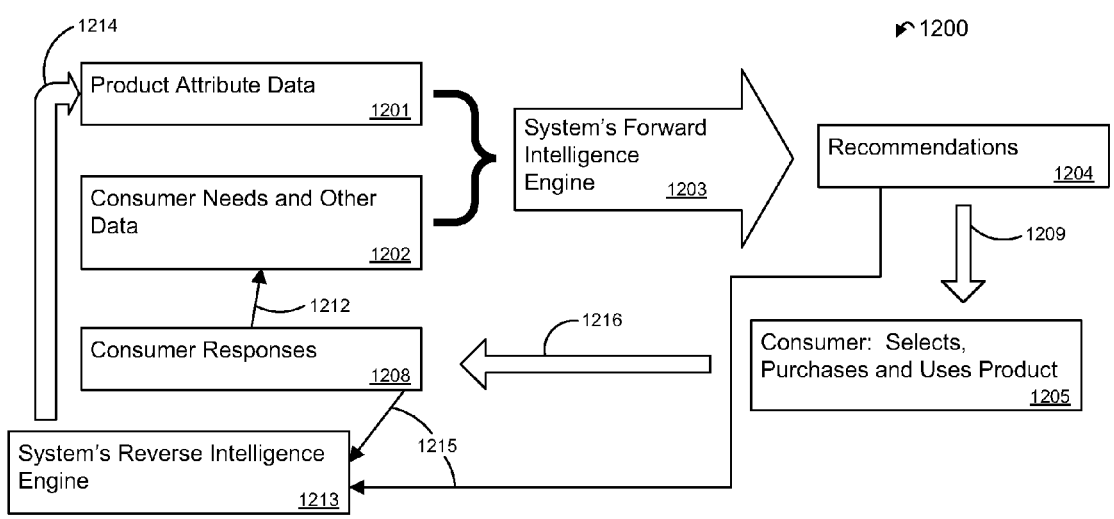
FIG. 12 illustrates in functional form how feedback is utilized in certain embodiments of the invention.

FIG. 12 shows in functional form how feedback is utilized in certain embodiments 1200 of the invention. Block 1201 represents product attribute data gathered by the system of the invention 1200 (or in the case of initial system startup, entered as priming data). Block 1202 represents consumer needs data, objective and/or subjective feedback (such as diagnostic data), personal profile information, and the like solicited or gathered by the system from consumers using system 1200. Arrow 1203 represents the operation of the system's product recommendation engine (also referred to herein as the forward intelligence engine) on the system inputs (i.e., blocks 1201 and 1202 information). Block 1204 represents the product recommendations generated by the product recommendation engine in arrow 1203 and output 1209 to consumer users of system 1200. Block 1205 represents the selection, purchase, and use of a product to treat a concern by consumers. Note, as a general matter the product selected and used by the consumers need not be one of the products recommended by the system 1200, or even presently within the knowledge base of the system 1200. Consumers may select and use any product they choose to treat a concern for which they have identified to the system 1200 (e.g., block 1202) and provide feedback about that product (e.g., 1208, 1212, 1216). Block 1208 represents feedback (e.g., new diagnostic measurements and subjective responses) received by the system 1200 from the consumers and incorporated 1212 within the knowledge base of system 1200. Arrows 1215 and 1214, together with block 1213, represent the re-training (sometimes referred to herein as a reverse intelligence engine) of the system's 1200 product recommendation engine (product recommendations 1204 are compared to actual consumer feedback 1208 in order to adjust product attributes 1201).

Feedback, whether objective and/or subjective in nature, regarding performance with respect to a range of products may be used to define individual consumer performance response profiles. When there are potentially a variety of underlying mechanisms contributing to a consumer's concerns, his or her performance response profile pattern may help the recommendation engine align his or her target substrates with other consumers who have common underlying problem mechanisms. Different underlying problems may be addressed differently by various products. For example, acne has several causes (microbial, desquamatory, inflammatory, and the like) that typical consumers could not distinguish using their senses alone, but which may be distinguished with the aid of diagnostic device measurements and/or by detecting the pattern of performance responses to different classes of products and actives.

Where the systems employ a neural network consumer feedback is used to enlarge and update the training set. The new feedback provides additional training examples used to reconstruct the neural network. For instance, consumer feedback may be used to adjust connection weights of the algorithms in the invisible layers of the neural network. In some implementation of a neural network, the updated training set is then used to adjust product attribute ratings for each consumer segment employed in some embodiments of the invention. As the number of consumer responses gathered by the invention increases, the accuracy and stability of the product attributes improves. In this re-training mode of operation, termed the "reverse intelligence engine" as shown in FIG. 12, the neural network uses consumer responses and outputs of the invention's forward intelligence or product recommendation engine as inputs and optimizes product attributes to improve recommendation accuracy in an iterative process. Objectives of this re-training are numerous and include improving the accuracy of future recommendations, generating insights on product performance for the purpose of product development, and the like. The invention may also improve the accuracy of predictions for each consumer as it learns more about the consumer's subjective and/or objective responses to products.

Part of the learning function referred to above may include periodically determining whether the feedback supports any bases for grouping consumers in a way that narrows the standard deviation of preference and/or performance distributions within any client neighborhood. If such bases are found they are incorporated into the algorithms of the product recommendation engine and used to subset appropriate neighborhoods when generating predicted performance and/or preference ratings and the like. It is important to note that while knowledge of a product's effect is made more accurate as the standard error of the mean is reduced, predicting an individual's response depends on the width of the distribution of effects measured over the population of similar users. It is assumed the distribution reflects primarily true variety of response and not measurement accuracy. The standard deviation needs to be as narrow as possible to increase prediction accuracy. Therefore, reducing the limiting distance of a collaborative set involves a trade-off between reducing the standard deviation of the prediction (to improve precision) and increasing the standard error of the estimate (reducing accuracy) because the number of consumers contributing sample information is smaller.

Professional Integration

Professional integration refers to use of the invention by professional service providers. Typically professional integration involves the construction of a professional interface, which may comprise a series of software and/or specialized diagnostic tools that allow professionals access to consumer data and characterizations (individual and/or populations). Professional integration also refers to methods of referring a consumer served by the invention to a professional service provider (such as a physician in the case of medical targets) when conditions outside of the normal range of values are detected by the invention or when the system has objective or subjective feedback data indicating a professional service rates highly to address the concerns of a consumer. As data on professional assessments of needs, causes thereof, prescribed treatments, and/or feedback from professionally recommended products is acquired, the invention's product recommendation engine may be re-trained and the invention itself may aid professionals in their needs assessments, treatment recommendations, and the like. In particular, where medical targets are involved the data analysis performed by certain embodiments of the invention may detect patterns of responses that may be instrumental in predicting best therapeutic options to use to treat disease conditions and the like. The converse may be true as well.

Figure 13:
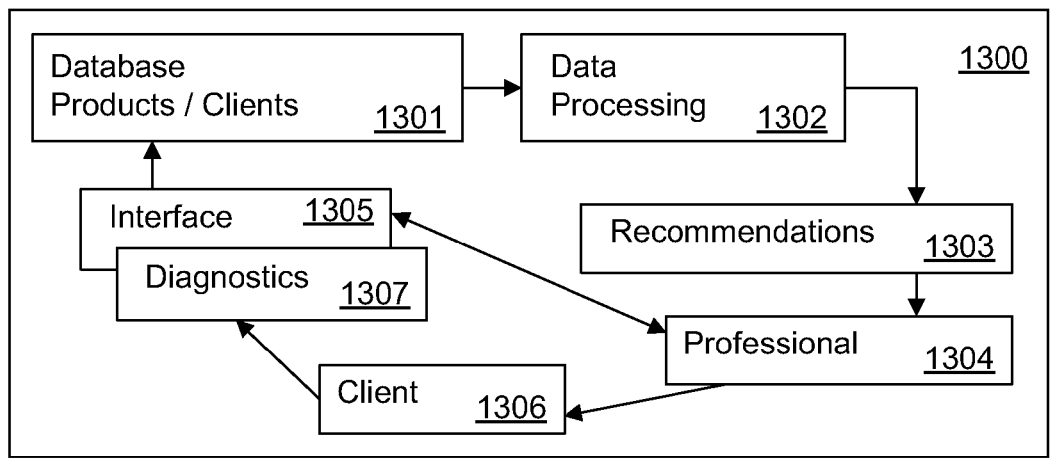
FIG. 13 illustrates in functional form how an exemplary professional only embodiment of the invention operates.

Embodiments of the invention may be implemented wherein product recommendations (e.g., predicted performance, predicted preference, and the like) and/or ancillary information for specific products and services obtained from a professional (e.g., prescription drugs and the like) are reported to the professionals but not directly to the consumers. FIG. 13 illustrates in functional form how some professional only embodiments 1300 of the invention may operate. Block 1301 represents a database wherein product and consumer information comprising at least a portion of the invention's knowledge base. Block 1302 represents the data processing portion of a product recommendation engine that operates on data drawn from database 1301 and a request from an individual consumer and/or a professional servicing that consumer to generate product recommendations 1303. Block 1304 represents a professional service provider who is the only person to receive the product recommendations 1303 generated by system 1300. Professional 1304 conveys that information he or she deems appropriate to the individual consumer/client 1306. Professional 1304 provides feedback about the individual consumer/client 1306 to system 1300 him or herself via a professional interface 1305. Consumer/client 1306 provides objective feedback 1307 such as diagnostic data to system 1300 as well.

Figure 14:
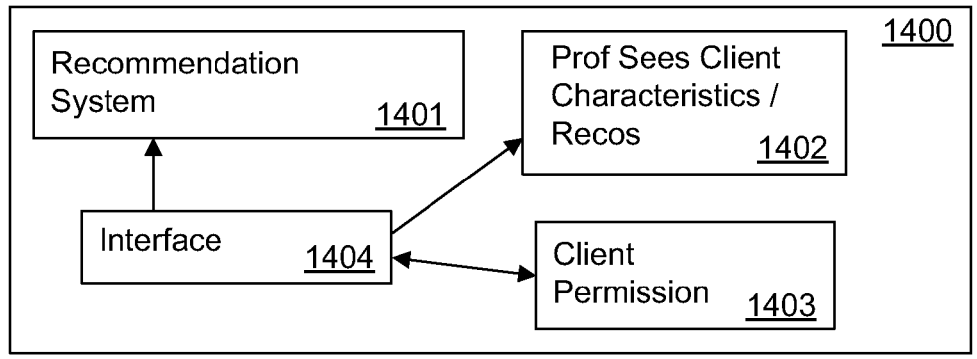
FIG. 14 illustrates in functional form how an exemplary professional authorized access embodiment of the invention operates.

Another embodiment of the invention comprises an implementation wherein a consumer authorizes a professional service provider access to his or her data. FIG. 14 illustrates in functional form how one such embodiment 1400 of the invention operates. With permission from the consumer/client 1304 his or her professional service provider 1402 (e.g., a physician where a medical target is involved) accesses the invention via professional interface 1404 to view consumer progress on historical, current, and/or proposed treatments, client characterization displays, product recommendations ("recos") for the consumer, and the like 1402.

Yet another embodiment of the invention may be implemented wherein both consumers and professionals may access data within and recommendations generated by the invention. In these embodiments, direct consumer access to the invention might be limited to viewing progress indicators (if provided), understanding their condition, and the like. Potential bases for implementing such an embodiment include, by way of example only, when diagnostic assessments of treatment performance can only be performed by a professional, when most treatments require professional administration, and the like. In the case of a medical target for example, acne patients could be characterized by the invention as to lesion type, distribution, stage, and patient condition and history parameters. In this case the invention would predict performance of alternative treatments based on continuous training of the predictive function. Input and access would be primarily available to physicians.

Figure 15:
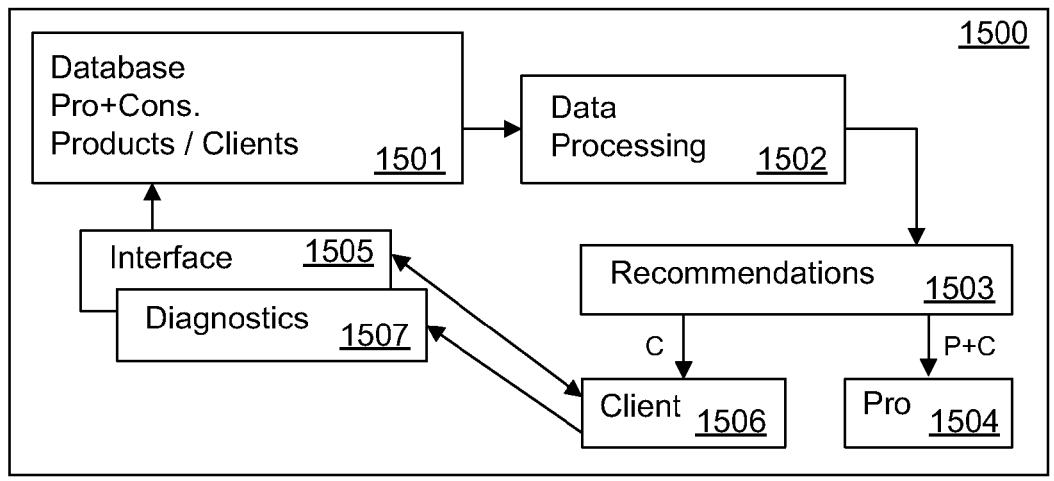
FIG. 15 illustrates in functional form how a first exemplary hybrid professional only embodiment of the invention operates.

FIG. 15 depicts in functional form how one such embodiment 1500 of the invention operates. Block 1501 represents a database wherein product and consumer information (gathered from both consumers and professional service providers) comprising at least a portion of the invention's knowledge base is stored. Block 1502 represents the data processing portion of a product recommendation engine that operates on data drawn from database 1501 and a request from an individual consumer and/or a professional servicing that consumer/client to generate output 1503 (e.g., product recommendations and/or ancillary information). Block 1504 represents a professional service provider and block 1506 represents the consumer/client for whom outputs 1503 were generated. The outputs 1503 are available to both consumer/client 1506 and professional 1504. Alternatively, all outputs ("p+c" for professional and consumer/client outputs) are available to the professional 1504 while a more limited number of the outputs ("c" for client outputs) are available to consumer/client 1506. Consumer/client 1506 provides feedback 1507 (e.g., diagnostic data, preference data, and the like) to system 1300 via professional interface 1505. Alternatively, professional 1304 provides feedback (not shown) about the individual consumer/client 1506 to system 1300 him or herself via the professional interface 1505 as well.

Where a professional is knowledgeable about an implementation of the invention, he or she may have a client begin using the invention as a consumer. Because professionals often have access to diagnostic characterizations (whether specialized or not), they often will be able to obtain and input into the invention a solid baseline assessment of the new consumer (i.e., new client or new user). Thereafter, depending on the implementation of the invention, the professional may be able to monitor the progress of the client/consumer via the invention. For instance, where the invention includes imaging capabilities a dermatology professional may enroll a patient and use the invention to track patient progress over time by monitoring changes in stored images. The invention may also allow the professional to annotate images with comments, indicate on the images important features or regions, and the like. Using feature analysis and intelligent processing, some embodiments of the invention may automatically register and align images collected at different times and quantify changes. The source of the images may be the professional, the consumer, other sources, or some combination thereof. Thus, such an implementation of the invention can be used in conjunction with visits by or to a professional as a way of increasing the frequency of monitoring. The professional could review client/consumer data from the invention (e.g., substrate images) at a convenient time and then contact the client/consumer to discuss the data and/or request that the patient/consumer and professional schedule a meeting.

Certain embodiments of the invention may collect and store data (e.g., images, physical characterizations, and the like) on clients/consumers assessed by professionals as to underlying conditions and/or causes. These embodiments may utilize any number of predetermined criteria for diagnostic accuracy (e.g., in the case of medical targets percentage of missed diagnoses when disease is present, percentage of wrong diagnosis when disease is diagnosed, and the like) to re-train invention's product recommendation engine (e.g., collaborative filters, neural networks, and the like). In this way the invention may aid the professional in earlier assessment of needs, causes, conditions, treatments, and the like than otherwise would be possible. Conversely, in another embodiment the invention may detect a need/condition that warrants professional treatment and advise the consumer to seek the same. For example, the invention could be programmed to monitor for potentially adverse conditions known to be associated with a particular product, and where detected, advise the consumer to contact the appropriate professional. Where medical targets are involved the invention also could compile and forward such information to an appropriate regulatory authority such as the Federal Food and Drug Administration (FDA).

Various embodiments of the invention may allow consumers and/or professionals to access ancillary output such as textual content related to specific conditions, treatments, and the like within a relevant product category (e.g., skin care). Professional content, largely scientific literature, may be segregated from nonprofessional content. Content searching tools may be provided as well.

Preferred embodiments of the invention involving certain forms of professional integration have some means of identifying whether a product is being used as part of a professional service. In these embodiments data on patients (versus consumers) will not contribute to the nonprofessional understanding of the effectiveness of nonprofessional products (e.g., non-prescription drugs in the case of medical targets). Two issues form the bases for this division of data, a reporting issue and a differential placebo effect issue. The first involves who provides the data input to the invention. Data for consumer systems is self-reported and self-rated. Data for professional systems is evaluated and reported by a professional and therefore likely to be more quantitative and more objective than consumer reported and rated data. With regard to the second issue, product efficacy may be affected by the attitudes of the user. Professional treatment may change the behavior of a client in a way that materially effects target substrate condition. Differential placebo effects operate in almost every clinical study environment. One can therefore expect similar phenomenon operating in a professional environment, particularly where medical targets and products are involved.

Certain embodiments of the invention can assist in data collection for clinical trials of new products. Typical clinical trials involve a vehicle or placebo and an active product that are tested among two populations of subjects. The subjects are randomly assigned to the active product or the placebo. The invention ensures all subjects meet the entrance requirements and any image data is graded blind to site or time point. The efficacy results of the active product can be compared to other available treatments and indications identified for consumers responding best to the new treatment (i.e., active product). The invention can also be used to compare the results of clinical trials with actual use of the new product by consumers outside the clinical paradigm.

Another use of the invention relates to the training of professionals. In the case of medical professionals such as dermatologists, the current method of training typically involves viewing individual patients and is restricted to small, random sample sizes. The database portion of the invention will contain a large amount of real-world data regarding target substrates and their response to various treatments over time. For example, in certain embodiments of the invention the database will have many images of normal and diseased skin, as well as data related to aging, the effects of sun and environmental exposure, and the effects of various skin-care products. The database also would contain data on treatments and how those images change as a function of the treatments over time. This data could be of great value in training professionals.

Methodologies

Figure 16:
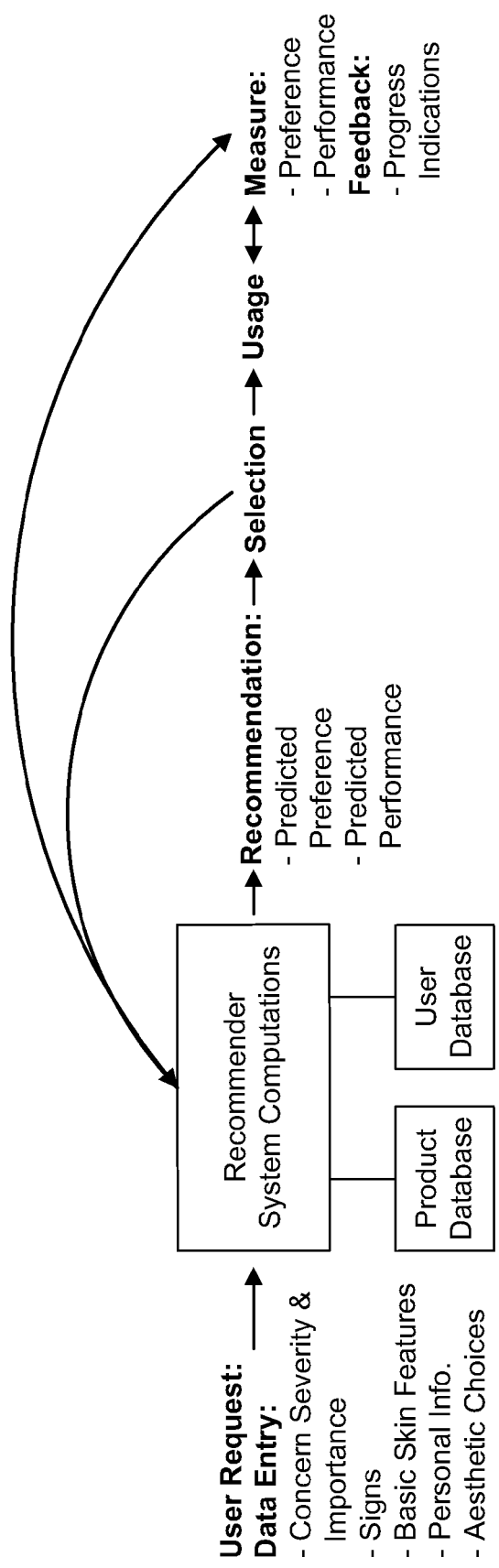
FIG. 16 illustrates a generalized process of a consumer interacting with an embodiment of the invention.
Figure 17A:
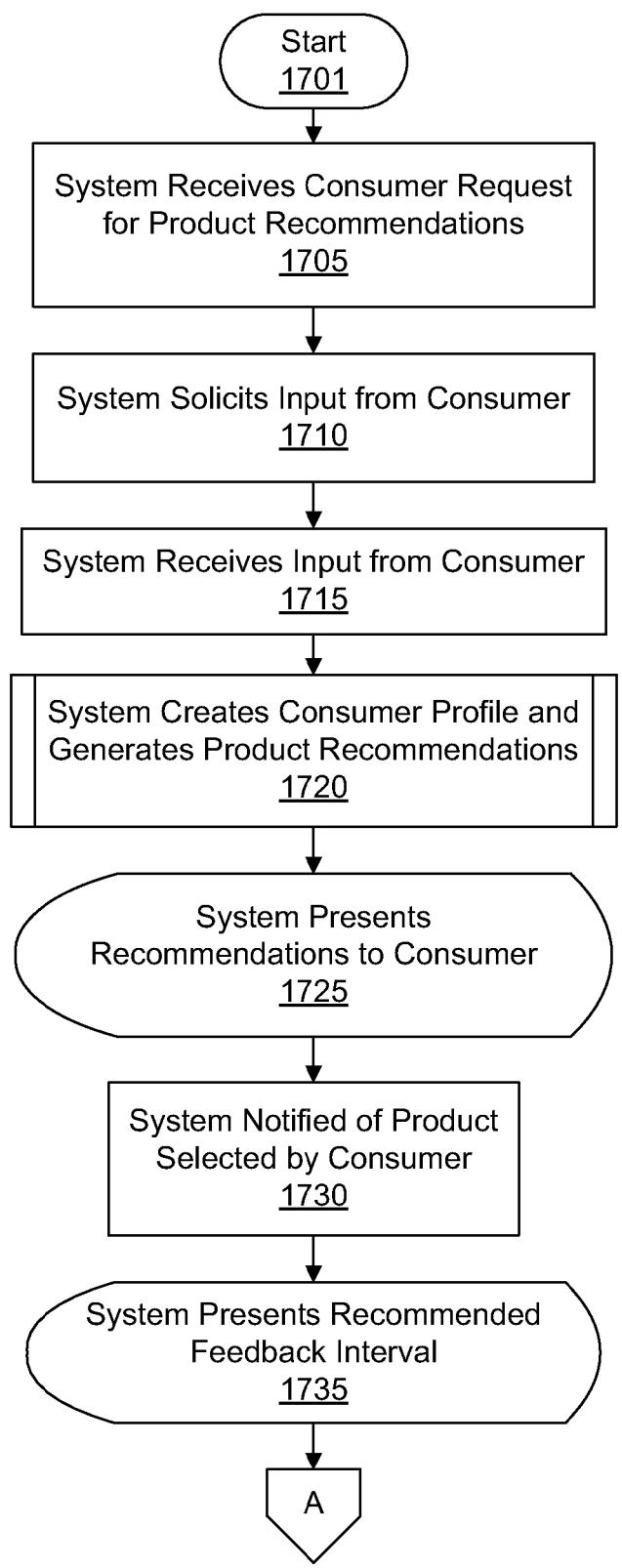
FIGS. 17A and 17B illustrate in flow diagram form a process for interacting with an embodiment of the invention.
Figure 17B:
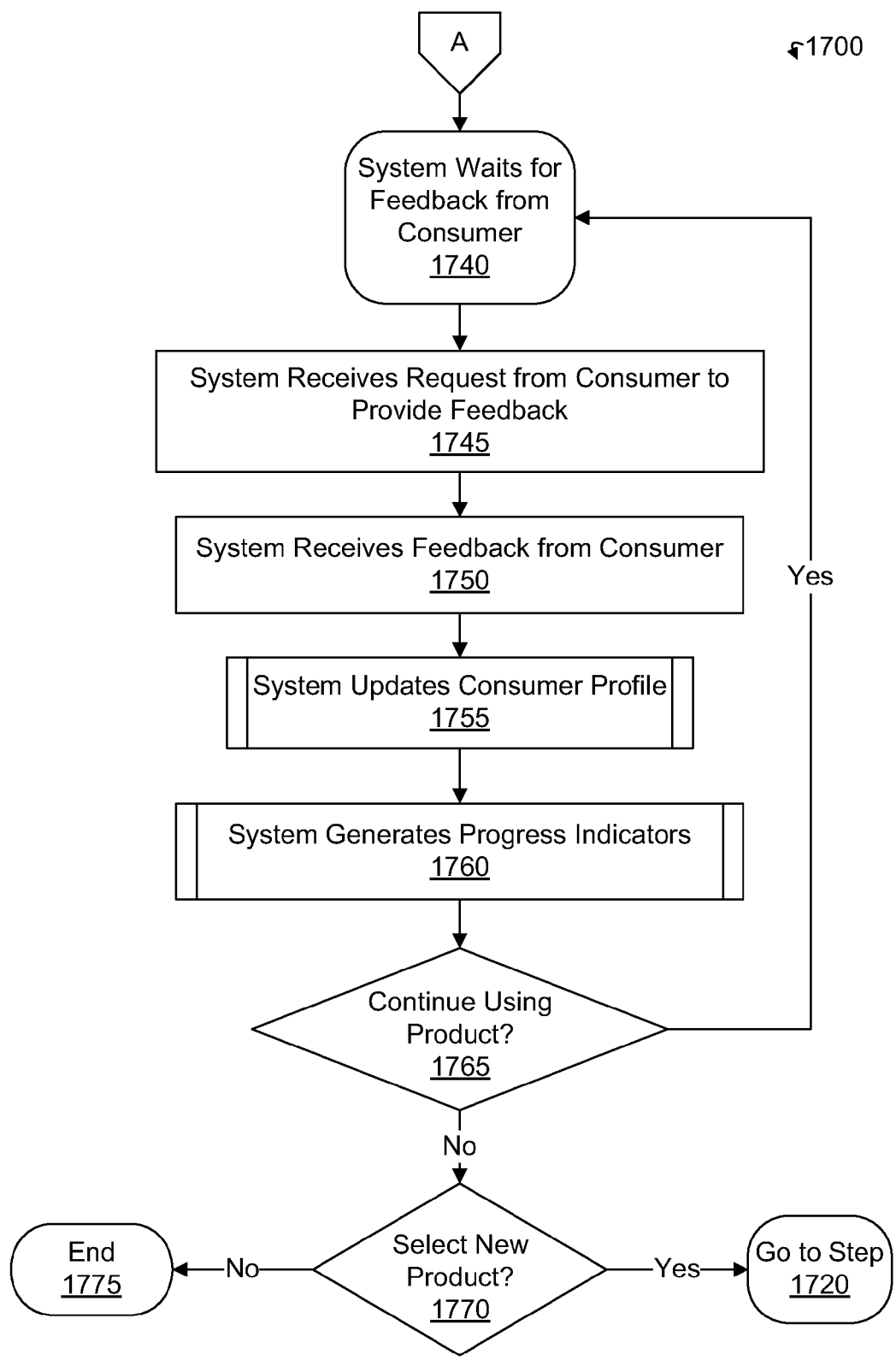

FIGS. 16 and 17 depict in functional and flow diagram form respectively a typical interaction of a consumer with certain embodiments of the invention. The process depicted in FIG. 16 mirrors for the most part that depicted in FIG. 17. As shown in FIG. 17A, process 1700 starts at step 1701 and, in step 1705, the invention receives a request from a consumer for product recommendations. In step 1710, the invention solicits input from the consumer, which is received at step 1715. As discussed above, input may comprise a wide variety of information including personal profile information, concern areas, severity and importance for each concern area, preferences for products used recently, and the like. In step 1720 the invention creates a consumer profile in its consumer database or other storage, and then generates product recommendations with its recommendation engine. In step 1725, the invention presents its recommendations to the consumer. Note also, the invention may present and/or the consumer may request and receive ancillary information output at this point in the process as well. In step 1730, the invention receives notification of the product(s) selected by the consumer for use. In step 1735, the invention presents the consumer with a recommended feedback interval. In step 1740 (FIG. 17B), the invention waits for feedback to be received from the consumer.

In step 1745, the invention receives a request from the consumer to provide feedback on the product(s) previously selected and subsequently used. In step 1750, the invention receives feedback data from the consumer. As discussed above, feedback may comprise subjective and/or objective data regarding actual performance and preference for the product(s) used by the consumer. In step 1755, the invention updates the consumer's profile, and in step 1760 the invention generates and delivers to the consumer progress indicators. In step 1765, the invention queries the consumer whether he or she will continue using the product(s). If yes, the process returns to step 1740 and waits for more feedback from the consumer. If no, the process in step 1770 queries the consumer whether he or she would like to select a new or different product to use. If yes, the process returns to step 1720. If no, the process ends in step 1775.

Figure 18:
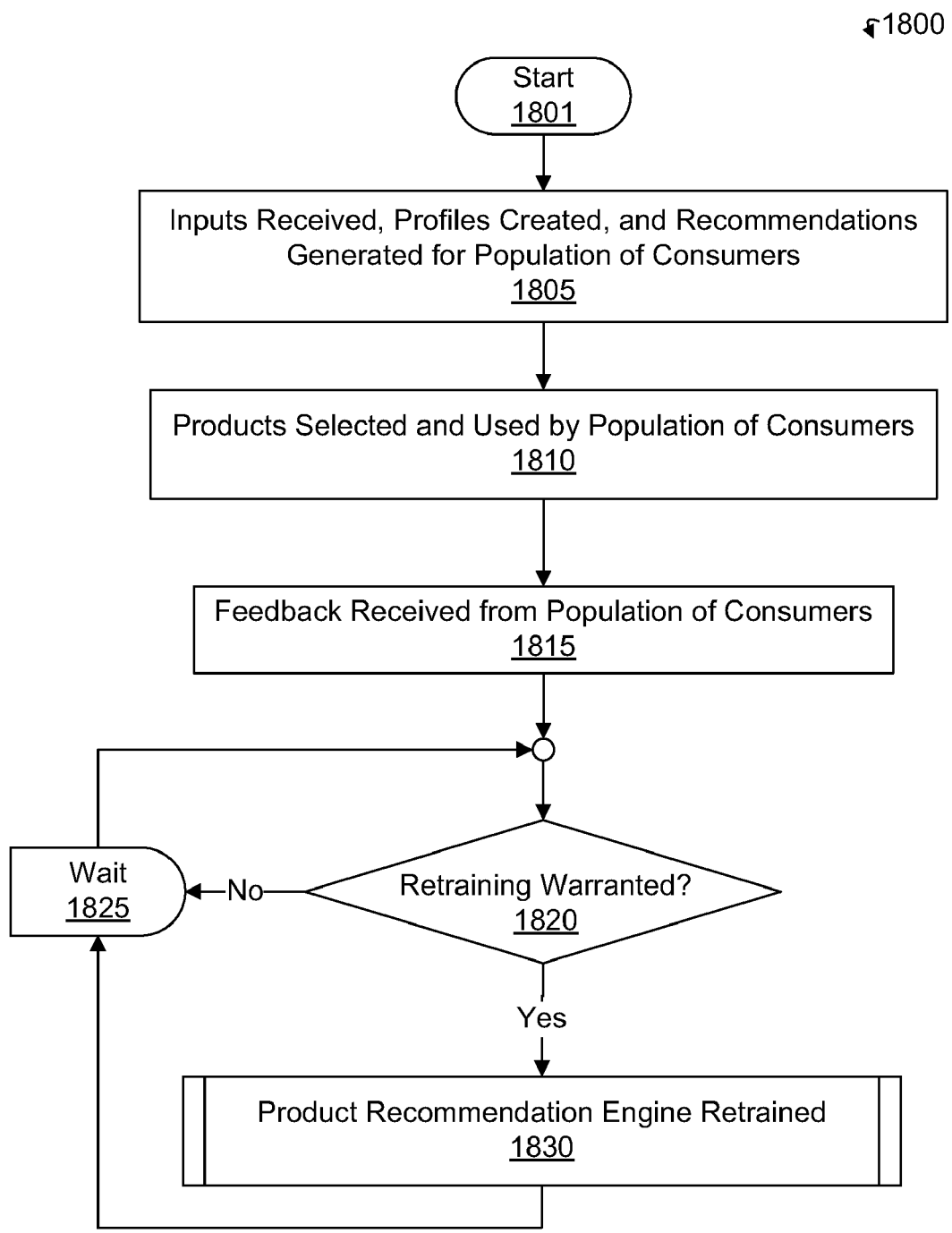
FIG. 18 illustrates in flow diagram form a process for re-training the recommendation engine in accordance with an embodiment of the invention.

FIG. 18 illustrates in flow diagram form a process 1800 for re-training the recommendation engine in accordance with certain embodiments of the invention. The process starts in step 1801 and, in step 1805, the invention receives individual input, creates individual profiles, and generates individualized product recommendations for a relevant population of consumers. In step 1810, the invention is informed of which products the individual consumers select for use. In step 1815, the invention receives feedback from the individual consumers regarding their use of the previously selected products. In step 1820, the invention determines whether the feedback received in step 1815 warrants re-training of the product recommendation engine. If yes, the invention in step 1830 re-trains the product recommendation engine based on the feedback received in step 1815 and then returns to wait step 1825. If no, the invention in step 1825 waits for some predetermined amount of time, some predetermined number of feedback interactions, a manual command, or the like before returning to step 1820.

Figure 19:
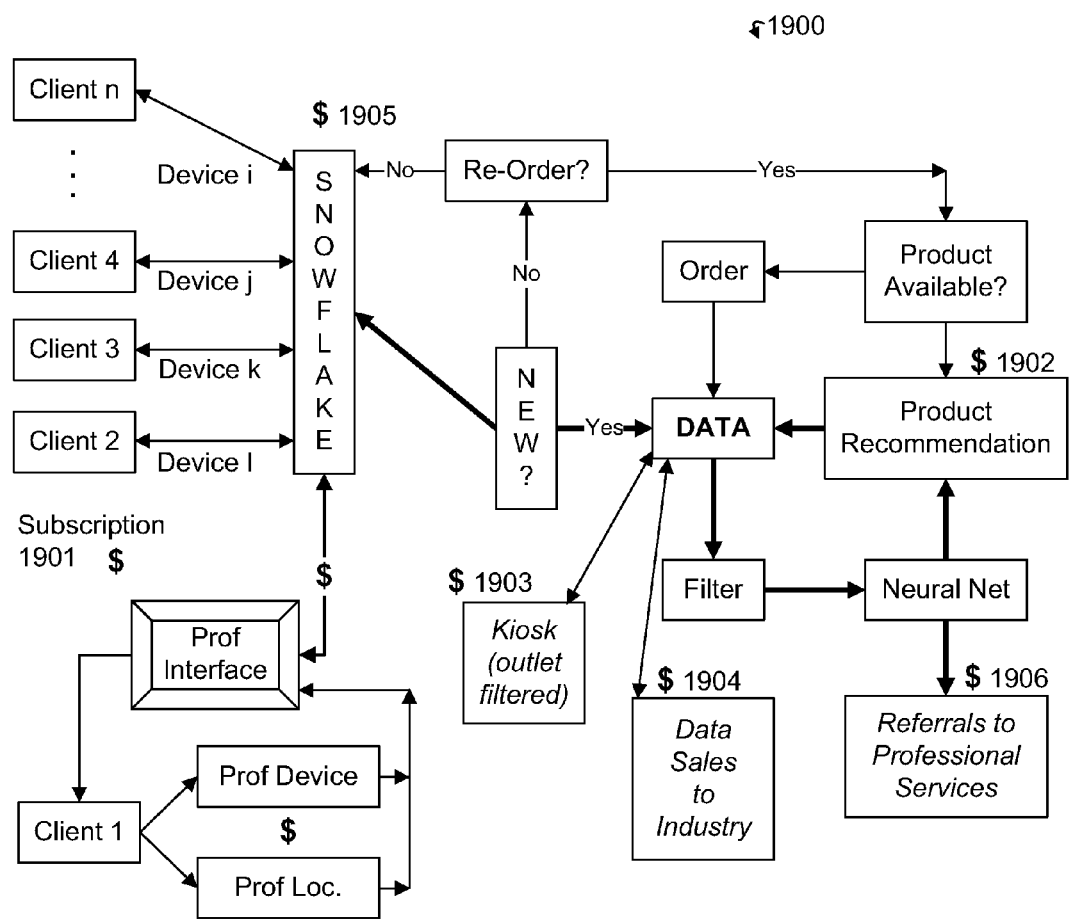
FIG. 19 illustrates an exemplary system incorporating an embodiment of the invention and a plurality of revenue stream generation points within the system.

FIG. 19 illustrates some of the concepts and potential revenue streams that may be realized with various embodiments of the invention. The invention can be a component of a product distribution system. Operating as a service provided over the Internet (or through the mail or by phone order), the invention facilitates transactions based on the consumer's educated selection process. The invention collects and creates previously unavailable high quality product performance and preference information, thereby creating novel revenue streams at multiple points within systems incorporating the invention. FIG. 19 identifies a number of these points with dollar signs ("$"). Also, whether incorporated within a wider a system or not, the knowledge accumulated and created by the invention has value to various shareholder groups including, but not limited to, consumers and third-party entities such as professional and non-professional service providers (e.g., medical and non-medical professionals), distribution chain entities (e.g., retail stores, wholesalers, and the like), product developers, marketing personnel, market analysts, and the like. Knowledge comprises any information gathered by, created by, contained or stored within the various elements of the invention.

Two revenue streams generated by the invention present themselves in the form of product recommendation fees 1902 and consumer subscriptions 1901. In the case of product recommendation fees 1902 a consumer pays a fee in exchange for receiving the product recommendations. In the case of subscriptions 1901, consumers pay a fee in exchange for ongoing access to invention recommendation services because of, among other things, the unique historical data the invention stores regarding the individual history of each subscriber. The history may include any number of items including, but not limited to, the physical and subjective responses of the consumer and/or their target substrate to particular products, weather, other relevant conditions, and the like. Over time, the invention obtains expertise in predicting each consumer's future responses by better characterization of the consumer-subscriber and more accurate alignment of the consumer-subscriber with other relevant segments of the population.

In some embodiments, a consumer can pay additional fees for premium services. For example, a consumer subscribing to the standard level of service may interact with the invention via a menu. A consumer subscribing to premium services may interact with the invention via a menu and/or a live person. Yet another level of service may involve interacting via a simulated persona.

In other embodiments of the invention, a consumer may choose from a plurality of rate plans where each rate specifies a plurality of factors such as, interaction method (home, spa, computer, and the like), minutes of interaction time, storage space (images, history, and the like), minutes of professional time, and the like. Standard level of service could provide top-N products by performance or preference. A higher subscription level would provide information on any number or products as well as arbitrarily named products. Another basis for differentiating subscription levels is on the diagnostic variables tracked for the subscriber. Basic level could involve no physical parameters, higher levels could include a few parameters, and the highest levels image based parameters. Service levels could be defined by the consumer's selection from a series of choices including but not limited to frequency of access, number of products rated, number of images stored per year, particular parameters chosen for monitoring, and the like.

Another revenue stream generated by the invention presents itself in the form of kiosks and other remote site access 1903. Kiosks (providing access to recommendations, ancillary information output, category wide product information, and the like) provide a way for consumers to access the invention at the site of product sales or without having personal Internet access. Ideal sites include wherever products are sold or near expert assistance. The services offered by kiosk may be at an introductory level and free to new consumers. Existing subscribers could access all information including those that incur charges to their account. Pre-paid cards could be sold or credit cards accepted for services as well.

The kiosk-based system may ask for consumer login information, or for new users, login information would be provided to permit easier future use. Log in could be biometric based. For new consumers a few questions might be presented to understand the general needs of the consumer. The invention might provide top-N recommended products filtered by availability at that store or for all stores at the location of the kiosk. The consumer also may be able to see recommended products available through mail order (unfiltered). In either display the output should be standardized (e.g., performance and preference sores and price.) For products not available at the location of the kiosk the consumer may have the option of selecting mail order. Various revenue exchanges are possible with this service. Consumers also could receive coupons to shop at the location. The operator of the invention may receive a commission when a kiosk-issued coupon is used locally. Kiosks could be placed in locations such as train stations, airports, malls, department stores, resorts, gyms, health spas, hair salons, any location where consumers wait to receive services, and the like.

Because certain implementations of the invention may be international in scope, the knowledge accumulated by the invention likely includes information on brands and/or categories of products not currently available in all areas of the world. The knowledge accumulated by the invention therefore can be used to facilitate identification of new brands, products, and/or ingredients that may prove successful in new markets. Information on the efficacy of products covered by an implementation of the invention can be made available for a fee and/or the most effective products in various categories could be made available in a static database of recommended products. Implementations of the invention also could integrate distribution facilities and/or functions for both domestic and foreign products.

Another potential revenue stream that may be realized presents itself in the form of data mining 1904. The invention's knowledge can be mined for intelligence of value to industrial components with interest in a particular product category. Data mined from the invention or intelligence may include, by way of example only, product performance and/or preferences among any segment of a market, objective performance and/or perceived performance for every category concern for any product, comparative performance between products, and the like. Additional data that can be mined from invention databases that could be valuable to industry includes, which consumers use and prefer which products, brand switching and loyalty data, product interactions and regimen effects; trends in population demographics and needs, and the like. Mined data or intelligence could be sold to entities formulating new products, entities wishing to document, test and/or validate new claims for products, or entities seeking competitive evaluation of products.

Another revenue stream that may be realized involves brokering services 1904. Products used by consumers may be identified by the invention that meet the criteria of companies interested in acquiring new products or technology in the target category. The operator of the invention can charge a fee for identifying products meeting the criteria of an acquirer. This method of identifying suitable products likely is better than simply monitoring purchases of new products because data from the invention may be available sooner and allow for easier separation of performance from preference and marketing factors.

Another revenue stream that may be realized involves payment of a commission for products purchased and/or consumers referred 1905. When a consumer orders a product directly from the operator of the invention for example (in embodiments where this type of purchase is an option), the product may be supplied by mail from an allied distribution company. The allied distribution company pays a commission on the sale to the operator of the invention in exchange. Coupon sales provide another example. Where a consumer wishes to purchase a recommended product through conventional shopping outlets, a link between the recommendation and purchase of the product may be created by issuing a coupon or voucher to the consumer. Manufacturers and/or retail outlets would offer the coupon as an incentive to select a particular recommended product and/or purchase a particular recommended product from a certain retailer. The consumer receives the discount and the operator of the invention receives a commission when the coupon accompanies the sale of the recommended product.

Revenue may be realized by directing a consumer to a section that may be incorporated in an embodiment of the invention devoted to new products. Manufacturers or other interested parties pay a fee to the operator of the invention in exchange for placing the new product in the special section of the invention, for incorporating the new product into the invention, and the like. Additional fees could be charged for access to the data generated and/or accumulated by the invention that relates to the new product.

Yet another revenue stream that may be realized with the invention comprises a professional referral fee 1906. Where an embodiment of the invention capable of detecting serious abnormal conditions that warrant professional services does so, professional service providers can pay a fee to the operator of the invention to be listed as potential service provider and/or for actually receiving a referral from the invention.

CONCLUSION

While the invention has been described in connection with the embodiments depicted in the various figures, it is to be understood that other embodiments may be used or modifications and additions may be made to the described embodiments for performing the same function of the invention without deviating from the spirit thereof. Therefore, the invention should not be limited to any single embodiment, whether expressly depicted and described herein or not. Rather, the invention should be construed to have the full breadth and scope afforded by the claims appended below.

We claim:

1. A method of formulating individualized product recommendations, comprising:
   receiving a first set of data from a consumer regarding a target substrate that includes a requirement to be addressed by a product; and
   generating a set of individualized product recommendations for the consumer from a plurality of products within a product category with an assistance of one or more computing devices, the generating comprising:
   feeding the first set of data as inputs into an intelligent performance-based product recommendation engine;
   classifying the consumer, based on the inputs, in a population of consumers who previously used a product in the product category in connection with a substantially similar substrate and who are substantially similar to the consumer;
   determining, based on the inputs and the classification of the consumer, a likelihood that the products in the product category will address the requirement with a predefined level of success when used in connection with the target substrate; and
   selecting a set of products from the product category having a predefined likelihood of successfully addressing the requirement, the selected set of products comprising the set of individualized product recommendations.

2. The method of claim 1 wherein the receiving a first set of data step comprises receiving a concern about the substrate.

3. The method of claim 2 further comprising receiving a severity of the concern.

4. The method of claim 2 further comprising receiving an importance of the concern.

5. The method of claim 1 further comprising receiving a second set of data from the consumer, the second set of data comprising historical product data, and wherein the first and second sets of data comprise the inputs into the product recommendation engine.

6. The method of claim 5 wherein the receiving the second set of historical product data step comprises receiving performance data for products used by the consumer in the past.

7. The method of claim 5 wherein the receiving the second set of historical product data step comprises receiving preference data for products used by the consumer in the past.

8. The method of claim 1 further comprising receiving a third set of data from the consumer, the third set of data comprising personal profile information about the consumer, and wherein the first and third sets of data comprise the inputs into the product recommendation engine.

9. The method of claim 1 wherein the classifying and determining steps comprise operating on the inputs with a neural network.

10. The method of claim 1 wherein the classifying and determining steps comprise operating on the inputs with a collaborative filter.

11. The method of claim 1 wherein the classifying and determining steps comprise operating on the inputs with a content-based filter.

12. The method of claim 1 wherein the classifying and determining steps comprise operating on the inputs with a cascaded content-based filter and collaborative filter.

13. The method of claim 1 wherein the set of individualized product recommendations comprises a first list of products and a scored predicted performance utility for each listed product.

14. The method of claim 1 wherein the set of individualized product recommendations comprises a first list of top-N products and a scored predicted performance utility for each listed product.

15. The method of claim 1 wherein the set of individualized product recommendations comprises a first list of products and a scored predicted preference utility for each listed product.

16. The method of claim 1 wherein the set of individualized product recommendations comprises a first list of top-N products and a scored predicted product preference utility for each listed product.

17. The method of claim 1 wherein the set of individualized product recommendations comprises a first list of products and a purchase price for each listed product.

18. The method of claim 1 further comprising generating ancillary information from the product recommendation engine inputs.

19. The method of claim 18 wherein the ancillary information comprises information regarding effects of at least one of the products.

20. The method of claim 18 wherein the ancillary information comprises information regarding the condition of the target substrate relative to a designated population of consumers.

21. The method of claim 1 further comprising:
communicating the set of individualized product recommendations to the consumer.

22. The method of claim 21 wherein the communicating step comprises generating and delivering a web page containing the recommendations to the consumer.

23. The method of claim 1 further comprising:
receiving feedback from the consumer regarding use of a product in connection with the target substrate.

24. The method of claim 23 wherein the receiving feedback step comprises receiving feedback from the consumer regarding use of a previously recommended product.

25. The method of claim 23 wherein the receiving feedback step comprises receiving preference data regarding the product.

26. The method of claim 23 wherein the receiving feedback comprises receiving performance data regarding the product.

27. The method of claim 23 further comprising:
re-training the product recommendation engine based on the feedback.

28. The method of claim 1 wherein the receiving a first set of data from a consumer step comprises receiving a first set of data about the consumer's skin, and the generating a set of individualized product recommendations for the consumer step comprises generating a set of individualized product recommendations from a plurality of skin-care products.

29. The method of claim 1 further comprising receiving a payment from the consumer.

30. A computer-readable medium having a program with computer-executable instructions for performing steps comprising:
receiving a first set of data from a consumer regarding a target substrate that includes a requirement to be addressed by a product; and
generating a set of individualized product recommendations for the consumer from a plurality of products within a product category by:
feeding the first set of data as inputs into an intelligent performance-based product recommendation engine;
classifying the consumer, based on the inputs, in a population of consumers who are substantially similar to the consumer and who previously used a product in the product category in connection with a substantially similar substrate;
determining, based on the inputs and the classification of the consumer, a likelihood that the products in the product category will address the requirement with a predefined level of success when used in connection with the target substrate; and
selecting a set of products from the product category having a predefined likelihood of successfully addressing the requirement, the selected set of products comprising the set of individualized product recommendations.

* * * * *